United States Patent [19]

Guyer et al.

[11] Patent Number: 4,597,041
[45] Date of Patent: Jun. 24, 1986

[54] METHOD AND APPARATUS FOR ENHANCING THE OPERATION OF A DATA PROCESSING SYSTEM

[75] Inventors: James M. Guyer, Marlboro; David I. Epstein, Framingham; David L. Keating, Holliston; Walker Anderson, Arlington; James E. Veres, Framingham; Harold R. Kimmens, Hudson, all of Mass.

[73] Assignee: Data General Corp., Westborough, Mass.

[21] Appl. No.: 441,839

[22] Filed: Nov. 15, 1982

[51] Int. Cl.[4] .................................................. G06F 9/24
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,157,587 | 6/1979 | Joyce et al. | 364/200 |
| 4,245,302 | 1/1981 | Amdahl | 364/200 |
| 4,310,879 | 1/1982 | Pandeya | 364/200 |
| 4,386,399 | 5/1983 | Rasala et al. | 364/200 |
| 4,450,519 | 5/1984 | Guttag et al. | 364/200 |

Primary Examiner—Thomas M. Heckler
Attorney, Agent, or Firm—Gerald Cechony; Joel Wall

[57] ABSTRACT

A data processing system having separate kernel, vertical and horizontal microcode, separate loading of vertical microcode and a permanently resident kernel microcode, and a soft console with dual levels of capability. The system includes a processor having dual ALC and microcode processors, and an instruction processor. Also included are a processor incorporating a multi-function processor memory, a malfunction nibble shifter, and a high speed look-aside memory control.

8 Claims, 9 Drawing Figures

| Op | AC | @ | INDEX | 8-Bit Displacement |
|---|---|---|---|---|
| 0 | 2 3 | 4 | 5 6 7 | 8　　　　　　15 |

A typical instruction format with an 8-bit displacement (word addressing)

| 1 | Index | AC | Op | 1001 | @ | 15-Bit Displacement |
|---|---|---|---|---|---|---|
| 0 | 1 2 | 3 4 5 | | 11 12 | 15 16 | 17　　　　　31 |

A typical instruction format with a 15-bit displacement (word addressing)

| 1 | Index | AC | Op | 1001 | @ | 31-Bit Displacement |
|---|---|---|---|---|---|---|
| 0 | 1 2 | 3 4 5 | | 11 12 | 15 16 | 17　　　　　47 |

A typical instruction format with a 31-bit displacement (word addressing)

| 1 | Index | AC | Op | 1001 | 16-Bit Displacement |
|---|---|---|---|---|---|
| 0 | 1 2 | 3 4 5 | | 11 12 | 15 16　　　　31 |

A typical instruction format with a 16-bit displacement (byte addressing)

| 1 | Index | AC | Op | 1001 | 32-Bit Displacement |
|---|---|---|---|---|---|
| 0 | 1 2 | 3 4 5 | | 11 12 | 15 16　　　　47 |

A typical instruction format with a 32-bit displacement (byte addressing)

*Fig. 2*

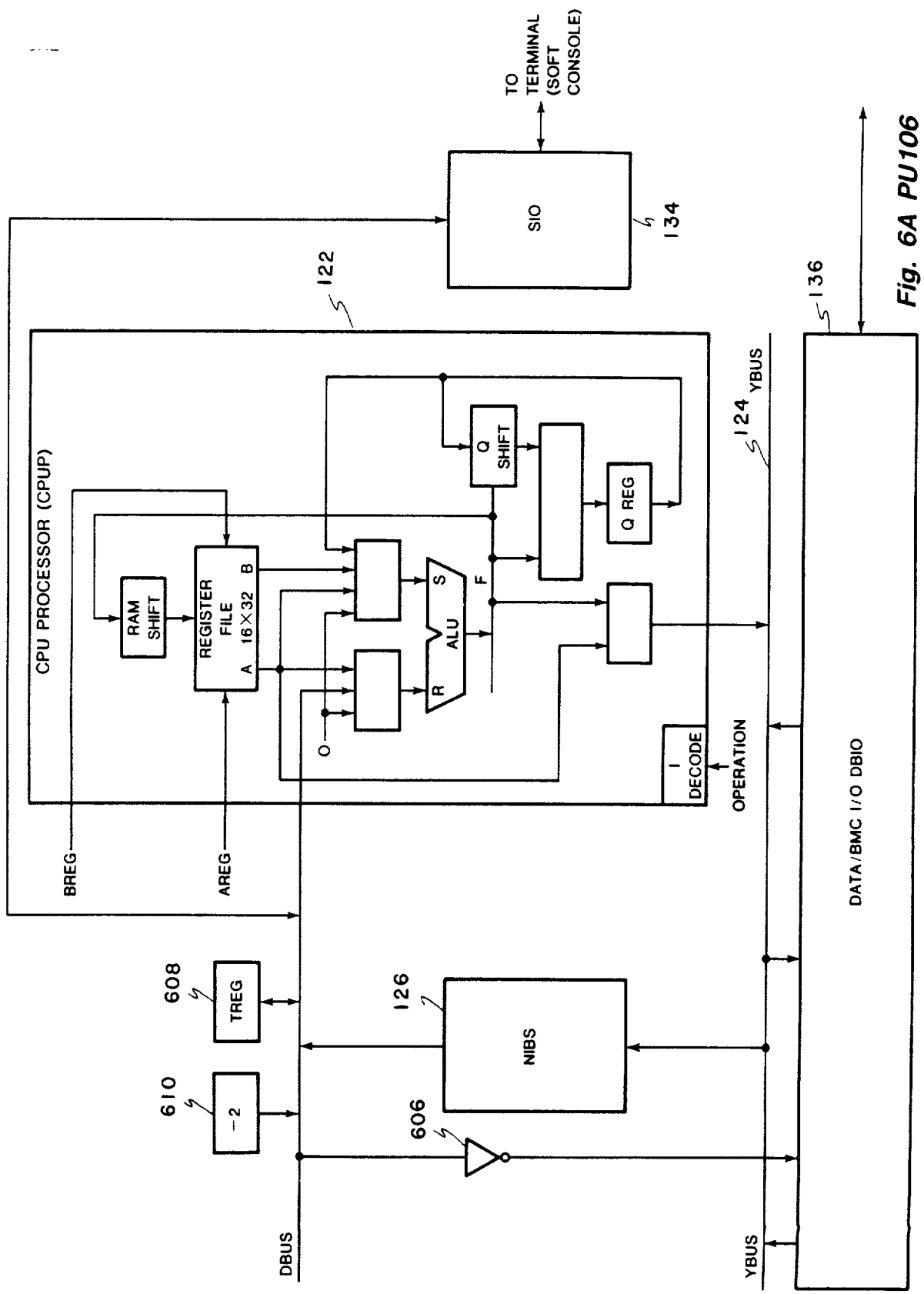
Fig. 6A PU106

METHOD AND APPARATUS FOR ENHANCING THE OPERATION OF A DATA PROCESSING SYSTEM

CROSS REFERENCE TO RELATED APPLICATIONS

The present application is related, in part, to U.S. patent application Ser. Nos. 441,967, 441,966, 441,837, 441,838, 441,836 and 441,969, all filed of even date herewith on Nov. 15, 1982 and all assigned to common assignee Data General Corporation.

1. Field of the Invention

The present invention relates to a high speed, compact data processing system and, more particularly, to circuitry therein to enhance operating speed, efficiency and capabilities of such a system.

2. Description of Prior Art

A common practice in the computer industry is for a manufacturer to provide a family of related computer, or data processing, systems. Various computers in such a family will be distinguished by size, complexity, capability and cost. Because of cost and, therefore, complexity constraints, lower level systems in such a family are usually not able to provide the capabilities and functions of the higher level systems. A lower level system may not, for example, provide as high a speed of operation or as large a memory space as a higher level system. In addition, a lower level system often may not be able to execute a program written for a higher level system because the lower level system does not offer the full functions and capabilities of the higher level system. Such a family of systems may therefore have upward compatibility, that is, programs written on lower level systems may be executed on higher level systems, but will not provide corresponding downward compatibility. For full compatibility within a computer system family, the lower level systems should offer, in general, the functionality and capabilities of the higher level systems.

The present invention provides computer system improvements which bear upon the above noted computer system capabilities, thus improving computer system speed, efficiency and capability, and also providing a solution for the aforementioned problems and limitations of the prior art, as will be discussed in detail herein below.

SUMMARY OF THE INVENTION

The present invention relates to computer system elements providing increased capability and efficiency. The present invention includes a system having separate kernel, vertical and horizontal microcode, separate loading of vertical microcode and a permanently resident kernel microcode, and a soft console with dual levels or capability. The present invention includes a processor having dual ALC and microcode processors, and an instruction processor. Also included is a processor incorporating a multifunction processor memory, a multifunction nibble shifter, and a high speed look-aside memory control.

It is thus advantageous to incorporate the present invention into a computer system because capability and efficiency is increased.

It is thus an object of the present invention to provide an improved computer system.

It is another object of the present invention to provide an improved computer system providiing increased speed and efficiency of operation.

It is yet another object of the present invention to provide an improved computer system providing increased capability and functionality.

Other objects and advantages of the present invention will be understood by those of ordinary skill in the art, after referring to the following detailed description of a preferred embodiment and drawings wherein:

BRIEF DESCRIPTION OF DRAWINGS

FIG. 2 is an illustration of certain, typical instructions;

DESCRIPTION OF THE PREFERRED EMBODIMENT

Figure 1:
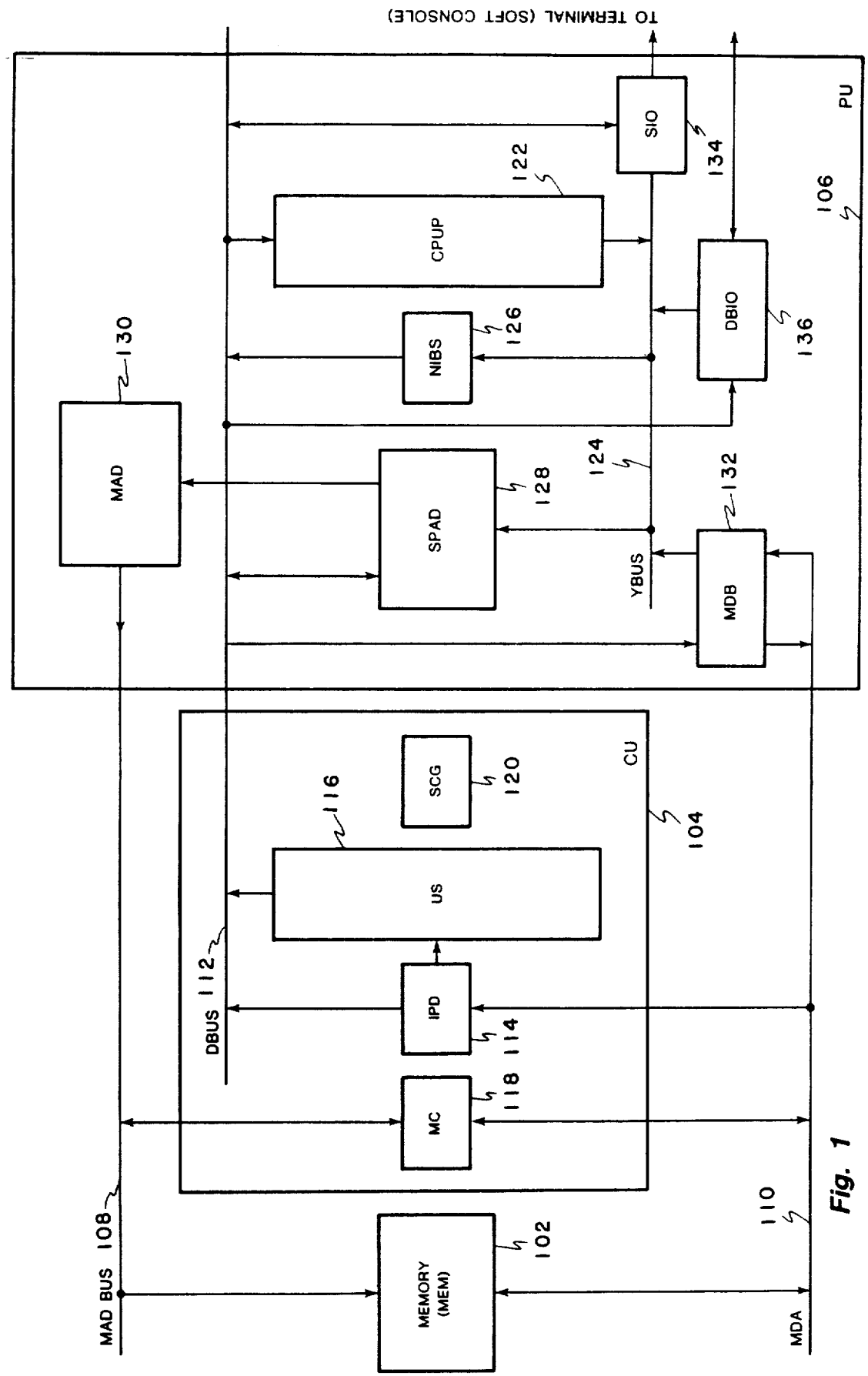
FIG. 1 is a block diagram of a computer system incorporating the present invention.

The following description presents the structure and operation of a computer system incorporating a presently preferred embodiment of the present invention. In the following description, the general structure and operation of the present system will first be described in an introductory overview. Next, certain basic features of the present system will be further described as a further introduction to following detailed descriptions of the system. The system will then be described in detail, followed by yet further detailed descriptions of certain features of the present system as necessary.

Certain conventions are used throughout the following descriptions to enhance clarity of presentation. First, each figure element referred to in the following descriptions will be referred to by a three or four digit reference number. The most significant digit of a three digit reference number or most significant two digits of a four digit reference number identify the particular figure in which an element referred to by that reference number first appears. The two least significant digits of a particular reference number identify the particular element appearing in that figure. For example, reference number 319 refers to the ninteenth element appearing in FIG. 3 while reference number 1020 refers to the twentieth element appearing in FIG. 10. A particular reference number assigned to a particular figure element is therefore always used to refer to that particular figure element. Therefore, element 319, which first appears as element 19 in FIG. 3, will thereafter be referred to by reference number 319 in all figures or descriptions.

Next, certain of the figures presented in conjunction with the following descriptions may occupy more than one drawing page. In such instances, a common figure number will be assigned to the drawing pages comprising that figure, and a letter designation will be appended to identify a particular drawing page of the figure. For example, FIG. 3 may occupy three drawing pages. The first page will be identified as FIG. 3, the second as FIG. 3A, and the third as FIG. 3B.

Finally, interconnections between related circuitry or system elements may be represented in two ways. First, interconnections between system elements may be represented by common signal names or references rather than by drawn representations of wires or buses. Second, common connections between circuitry or system elements may be indicated by a bracket terminating a lead and enclosing a designation of the form "A-b". "A" indicates other figures having a connection to the same common point while "b" designates a particular connection point.

INTRODUCTORY OVERVIEW

The following introductory overview will first identify and briefly describe the major elements of the present digital computer system. Certain features of operation of the present system will then be described in further detail as an introduction to following detailed descriptions of the present system.

A. System Overview (FIG. 1)

Referring to FIG. 1, a block diagram of Computer System (CS) 101 is shown. Major elements of CS 101 are Memory (MEM) 102, Control Unit (CU) 104, and Processor Unit (PU) 106. MEM 102 is used to store, for example, user programs comprising data and instructions. MEM 102 is described in detail in related U.S. patent application Ser. No. 441,968, filed of even data herewith on Nov. 15, 1982, and entitled "Universal Memory", and assinged to common assignee Data General Corporation, which is incorporated herein by reference. MEM 102 will not be described in further detail herein except as necessary for understanding of the structure and operation of the remaining elements of CS 101. CU 104 and PU 106, which will be described in detail in the following descriptions, respectively perform system control and program execution functions.

Major buses of CS 101 include Memory Address (MAD) Bus 108, which conducts memory read and write addresses from PU 106 and CU 104 to MEM 102. Memory Data (MDA) Bus 110 conducts data and instructions from MEM 102 to CU 104 and PU 106. Data (D) Bus 112 is connected between CU 104 and PU 106 as a primary path of information exchange between CU 104 and PU 106.

Referring to CU 104, major elements of CU 104 are Instruction Prefetch and Decoder (IPD) 114, Microsequencer (US) 116, Memory Control (MC) 118, and System Clock Generator (SCG) 120. IPD 114 is connected from MDA Bus 110 to receive instructions from MEM 102. IPD 114 operates in conjunction with certain elements of PU 106 to perform instruction prefetch operations; in addition, IPD 114 performs certain initial instruction decode operations, for example, with respect to instruction and data type, to initially determine certain subsequent operations to be performed by CU 104 and PU 106 with respect to execution of received instructions. IPD 114 provides certain outputs to D Bus 112, for example, information used by PU 106 in addressing and fetching data from MEM 102. IPD 114 also provides instruction outputs to US 116 for us by US 116 in controlling operations of CS 101.

As will be described in detail in following descriptions, US 116 includes memory and logic for providing microinstruction control of CS 101. In addition to certain outputs described below to D Bus 112, US 116 provides control outputs to other elements of CS 101 and accepts control inputs from other elements of CS 101.

Finally, SCG 120 comprises a central clock generator which provides clock outputs to all elements of CS 101. For clarity of presentation, the clock outputs of SCG 120 are not shown individually, but will be described in the following detailed descriptions as appropriate.

Referring to PU 106, as described above PU 106 performs functions directly associated with execution of user's programs. In this respect, Central Processing Unit Processor (CPUP) 122 performs arithmetic and logic functions and is connected between D Bus 112 and Y Bus 124. Y Bus 124 is an information transfer path within PU 106. Nibble Shifter (NIBS) 126, also connected between D Bus 112 and Y Bus 124, operates in conjunction with CPUP 122 and other elements of CS 101 to perform, for example, nibble shifting, memory address and data alignment operations.

Scratch Pad and Address Translation Unit (SPAD) 128 is a multifunction element also connected between D Bus 112 and Y Bus 124. SPAD 128 operates as a scratch pad memory for PU 106 and also performs certain address mapping operations, as will be described in detail in the following descriptions.

Memory Address Unit (MAD) 130 is connected from SPAD 128 and has outputs connected to MAD Bus 108 MAD 130 provides read and write addresses to MEM 102. In addition to other functions, MAD 130 operates in conjunction with IPD 114 to perform instruction prefetch operations.

Memory Data Buffer (MDB) 132 is connected between MDA Bus 110 and D Bus 112 and Y Bus 124 and is a primary path for data transfer between PU 106 and MEM 102.

Finally, Serial I/O (SIO) 134 and Data and Burst Multiplexer Channel I/O (DBIO) 136 operate as principal paths of information exchange between CS 101 and external devices, such as terminals and bulk memory storage units. SIO 134 is used for communication of serial information between CS101 and, for example, a terminal. DBIO 136 provides, for example, three modes of parallel information transfer, such as, Programmed I/O, Data Channel I/O, and a Burst Multiplexer Channel. As indicated in FIG. 1, SIO 134 has a bi-directional connection from D Bus 112 while DBIO has an input path from D Bus 112 and an output path to Y Bus 124.

Having briefly described the overall structure and functional elements of CS 101 with reference to FIG. 1, certain basic features of CS 101 will be described next below.

B. Instruction Sets

The present implementation of CS 101 is as a 32 bit computer system; that is, CS 101 generates and manipulates 32 bit addresses and 32 bit data elements. CS 101 is designed to be compatible with two earlier generations of data processing systems, that is, capable of executing programs created for use on the earlier data processing systems. One earlier family of data processing systems is a 16 bit system, for example, the Data General Corporation ECLIPSE ® computer systems. A second earlier family of computer systems are 8 bit systems, for example, Data General Corporation NOVA ® computer systems. As such, CS 101 is capable of executing three different instruction sets, the NOVA instruction set, the ECLIPSE instruction set, and a new instruction set, that for the Data General Corporation LECLIPSE MV/8000® systems. Each of these instruction sets contain two classes of instructions: Arithmetic and Logic Class (ALC) instructions, which define an arithmetic or logic operation to be performed, and memory reference instructions, which define operations to be performed with data to be written into or read from memory. ALC instructions in general include only an operation code (opcode) field defining the operation to be performed. In kmemory reference instructions, a displacement field containing information relating to the location, or address, of the data to be operated upon is added to the opcode field. NOVA instructions use 8 bit opcode fields while ECLIPSE and MV/8000 instructions use 16 bit opcode fields. NOVA and ECLIPSE instructions use, respectively, 8 and 16 bit displacement fields, while MV/8000 instructions use 16 or 32 bit displacement fields. NOVA and ECLIPSE instructions are referred to as "narrow" instructions and MV/8000 instructions as "wide" instructions.

CS 101's instruction set allows CS 101 to manipulate data elements having widths of 8, 16, or 32 bits. In addition, and as will be described further below, CS 101 is capable of generating addresses in two ranges. The first range, using 32 bit addresses, allows CS 101 to address a logical address space of 4.3 billion bytes, or four gigabytes. The second, using 16 bit addresses, allows CS 101 to utilize a 64 kilobyte addressing range.

During the following descriptions, a byte is defined as 8 bits of information, a word is defined as 16 bits (2 bytes), and a double word is defined as 32 bits (2 words, or 4 bytes). In general, most operations performed by CS 101, for example, generation of addresses and manipulation of data, are performed in double word (32 bit) elements.

C. Addressing

As described above, CS 101 may utilize 32 bit addresses for byte addressing, or 31 bits in word addressing, and thereby has a logical address space, that is, a user visible address space, of four gigabytes. This logical address space is partitioned for purposes of memory management into eight 512 megabyte sections called segments and referred to as segments 0 to 7. Each logical address contains, in the three most significant bits, information identifying a particular segment in which a data item is located. The remaining 29 bits identify the location of the data item in the segment.

The size of CS 101's logical address space means that not all logical address locations can be represented in MEM 102 at the same time. For this reason, CS 101's logical address space is further divided into pages. Each page is a two kilobyte block of contiguous logical or physical addresses. A demand paging system moves pages between MEM 102 and external storage devices upon demand and tracks pages currently in MEM 102. An address translation unit, described in detail below, translates logical addresses into corresponding physical addresses in MEM 102 for pages represented in MEM 102.

Logical addresses may use to reference two types of information, data and instructions. To reference instructions, PU 106 uses logical addresses generated by a program counter (PC), located in PU 106, which is incremented to read sequential instructions from memory. As described above, bits 1 to 3 of the PC specify a current segment from which instructions are being read, while bits 4 to 31 specify an address within that segment. It should be noted that logical addresses generated by the PC contain 31 bits of address rather than 32 as CS 101 performs addressinng on the word level. As will be described further below, CS 101 actually reads or writes only double words to and from MEM 102, thus requiring 30 bits of address rather than 31 or 32 bits.

In contrast to instructions, which are addressed directly, data is addressed indirectly through instructions. CS 101 utilizes information coded in the referencing instructions to construct the logical addresses of the data so referenced. Among other factors, data appears in different types and lengths and the structure of the data effects the generation of logical addresses referencing data. The Data types may include, for example, fixed point numbers, floating point numbers, decimal numbers, alphanumeric character strings, and bit strings. Data lengths may, for example, include bits, bytes (8 bits), words (16 bits), and double words (32 bits). In addition, the locations of various data items may be specified as a displacement, or offset, relative to various base addresses, as will be described below.

To reference an element of information in logical memory, therefore, a referencing instruction will provide information used by CS 101 to construct a logical address of the referenced data item. Various typical instruction formats used in CS 101 and containing such information are illustrated in FIG. 2. The instruction illustrated on line A represents a narrow instruction of 8 bits, while the instructions illustrated on the remaining lines represent typical 16 and 32 bit instructions, as previously described. As shown in FIG. 2, each instruction includes an Operation, (OP) Code indicating an operation to be performed with the referenced data, and an Accumulator (AC) Field designating a source or destination accumulator as appropriate.

Each instruction includes a displacement field of 8, 15, 16, 31, or 32 bits, depending upon whether the instruction is referencing a byte or a word of data. Each instruction further includes an index bit field (e) identifying the source of the base address from which the displacement (offset) specified in the displacement field is taken to determine the logical address. The index bits are capable of specifying four different addressing modes, that is, four different sources for a base address from which displacement is taken to locate the data referred to by the instruction displacement field. A first mode lis Absolute mode and uses logical address zero as base address. A second mode is Program Count (PC) relative wherein the present PC address is used as base address. The remaining two modes select as base address the contents of either of two accumulator registers residing in PU 106. Both the instructions and the logical addresses resulting from the operation described above contain a single bit field which identifies whether the logical address is a final logical address, or whether indirect addressing has been specified. In indirect addressing, a logical address resulting from resolution of the instruction is treated as a pointer to yet another address. The address pointed to may, in turn, be a final logical address or, as indicated by its indirect bit field, may be an indirect pointer to yet another logical address.

Finally, as previously described the logical address space of CS 101 is larger than the physical address space of MEM 102. As such, two Kbyte pages of information storage containing instructions or data, or both, are transferred between MEM 102 and external storage devices as required. As a result, logical addresses generated by CS 101 must therefore be translated into equivalent physical addresses in MEM 102 of pages residing therein.

CS 101 performs logical to physical address translation operations through the use of Page Tables (PTs) and Segment Base Registers (SBRs). A PT is a table of entries containing information for translating logical addresses to a physical addresses. Each entry in a PT, referred to as a Page Table Entry (PTE), contains the necessary information relevant to one page of storage residing in MEM 102. In conjunction, there exists a SBR for each segment of CS 101's logical address space. Each SBR contains the physical base address of a PT containing entries for those pages of the corresponding segment residing MEM 102. The contents of each SBR indicates whether the corresponding segment is currently defined, that is, usuable by CS 101, the number of PT levels necessary for logical address translation, as will be described further below, and the address translation information.

Each PTE contains information indicating whether a particular page is currently defined, that is, accessible to CS 101, and whether the corresponding page is presently residing in MEM 102. Each PTE also contains information regarding access rights to the information stored in the corresponding page; that is, whether a reference to the corresponding page may perform a read operation, a write operation, or execute instructions contained therein. Each PTE also contains physical page address information defining the physical address or location in MEM 102 of the page corresponding to a particular logical address. The physical address contained in each PTE may reference either of two items, depending upon whether a one level PT translation is to be performed or a two level PT translation is to be performed. If a one level translation is to be performed, the PTE physical address contains the physcial address of the page referenced by the corresponding logical address. If a two level translation is to be performed, the PTE address field contains the address of a second PT, which in turn contains the final physical address of the page referenced by the logical address. The utilization of both one and two level PT translations allows CS 101's address space to be tailored to a particular user program. For a smaller program, a one level mechanism would be utilized, while for larger programs two level translations would be performed.

Figure 3:
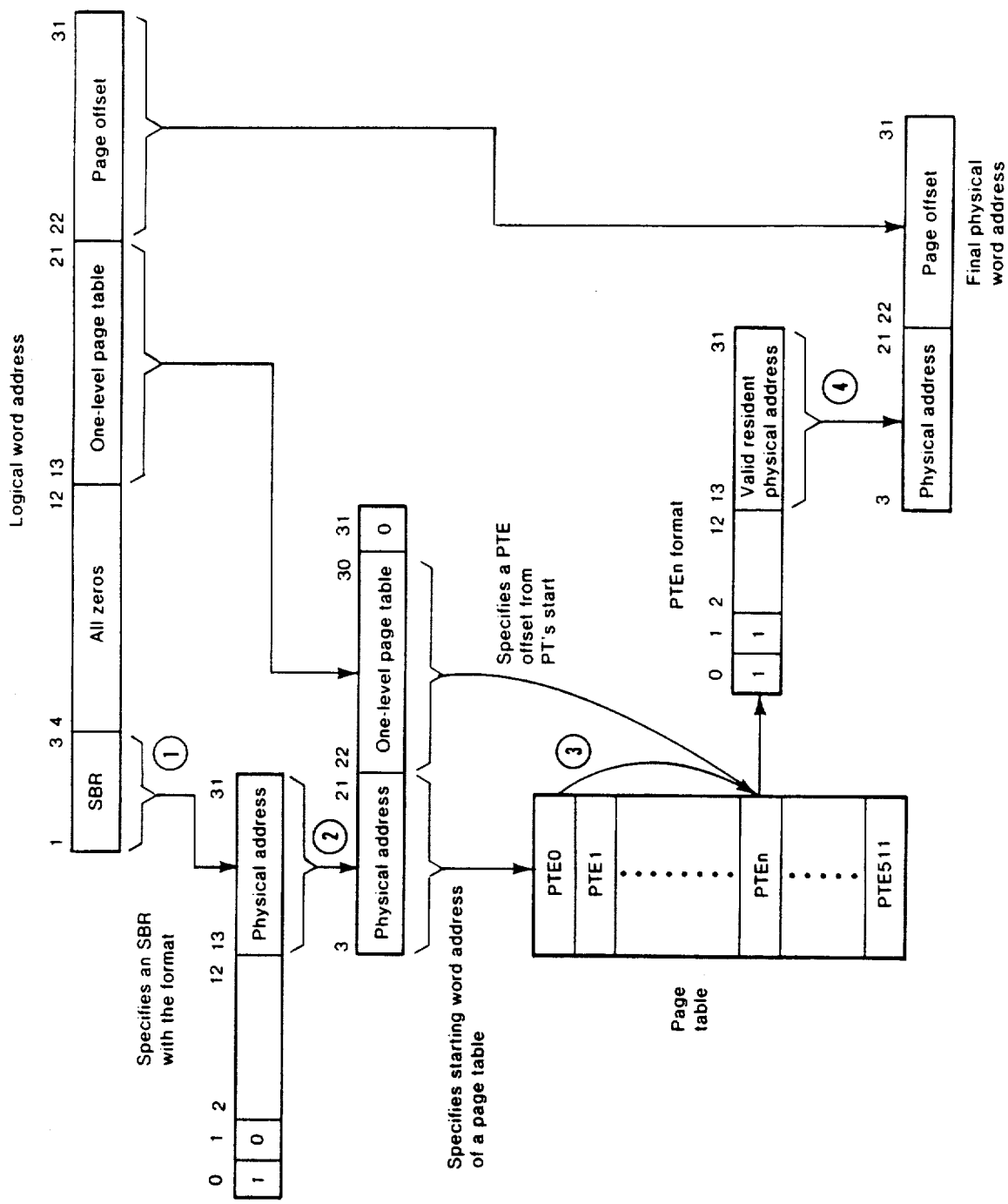
FIG. 3 is a diagrammic representation of a single level address translation.

Referring to FIG. 3, a diagramic representation of a one level page table translation is shown. Represented therein is a logical address to be translated, one of CS 101's SBRs, and a typical page table containing a plurality of PTEs.

As indicated in FIG. 3, the logical address includes an SBR Field identifying a particular one of CS 101's SBRs, in this case the SBR represented in FIG. 3, a single level page table address field, and a page offset field. CS 101 utilizes the SBR field of the logical address to select a corresponding one of CS 101's eight SBRs. CS 101 reads from that SBR a physical address field which identifies.the start, or base address, of a corresponding page table, that is, the page table represented in FIG. 3. The single level page table address field of the logical address represents an offset, from the start of the page table located by the physical address field of the SBR, to the particular PTE containing the physical address information corresponding to the logical address to be translated. Together, therefore, the physical address field of the SBR identified by the SBR field of the logical address and the single level page table field of the logical address identify the physical address of a corresponding PTE in the page table.

A PTE so identified includes, as indicated in FIG. 3, a valid resident physical address field which identifies the physical starting address of a particular page residing in MEM 102. The page offset field of the logical address specifies an offset, relative to the start of the page in MEM 102 identified by the valid resident physical address field, of the PTE of the particular word to be addressed. The physcial address field of the PTE and the page offset field of the logical address thereby together comprise the physical address in MEM 102 of the word referenced by the logical address represented in FIG. 3 and the logical to physical address translation has been completed.

Figure 4:
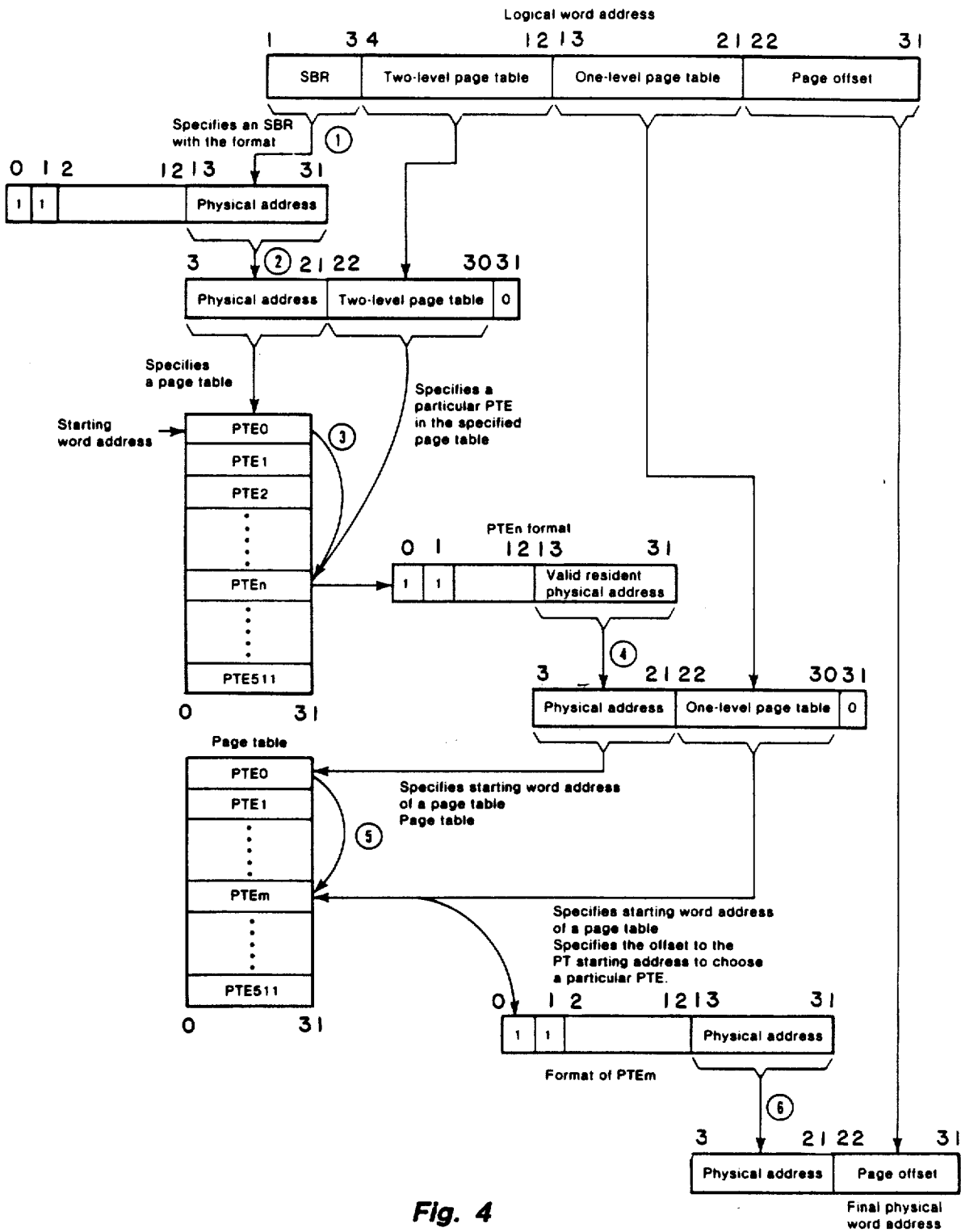
FIG. 4 is a diagrammic representation of a two level address translation.

Referring to FIG. 4, a two level page table translation is represented. As indicated therein the general procedure for a two level page table translation is similar to that of a one level page table translation except that an additional reference through a second page table is performed. The logical address includes, in addition to the single level page table address field, a double level page table address field. The double level page table address field of the logical address is utilized, together with the physical address field of the SBR identified by the SBR field of the logical address, to generate a physical address of a particular PTE in a first page table. The valid resident physical address field of the PTE of the first page table is then combined with the single level page table address field of the logical address to generate a physical address of a second PTE in a second page table. In this case, the valid resident physical address field of the PTE of the first page table identifies the physical starting address of the second page table. The single level page table address field of the logical word address identifies an offset, relative to the start of the second page table, of the second PTE. The physical address field of the second PTE is then combined with the page offset field of the logical address to generate the final physical address referred to by the logical address.

Finally, as described above, CS 101 transfers pages between MEM 102 and extenal storage as necessary. This operation is performed by CS 101's memory management system, of which CS 101's address translation mechanism is a part. CS 101's address translation mechanism performs, in particular, two functions with regard to CS 101's memory management mechanism. First, CS 101's address translation mechanism monitors which of the pages resident in MEM 102 are referenced in read or write operations, and which pages are most frequently referenced. When it is necessary to transfer a page out of MEM 102 to external storage in order to transfer in another page, CS 101's memory management system utilizes this reference information to determine which pages have not been referenced or have been least frequently referenced in determining which pages resident in MEM 102 can be replaced. Secondly, CS 101's address translation mechanism monitors which of the pages in MEM 102 have been referenced by write operations, that is, which pages in MEM 102 have been modified and are no longer identical to the copies of those pages residing in external storage. If a particular page has been referenced in a write operation, it is necessary for CS 101 to copy that page back external storage when that page is replaced by another page from external storage. If that particular page has not, however, been referenced in a write operation, CS 101 may simply discard that page by writing a new page from external storage into the same address locations in MEM 102, thereby reducing the execution time required for a page swap. CS 101's address translation mechanism stores the above described memory management information, in the form of referenced/modified bits, in MC 118, which will be described in greater detail below.

DETAILED SYSTEM DESCRIPTION

Having described the overall structure and operation and certain basic features of CS 101 above, CS 101 will be described below in further detail. CU 104 will be described first, followed by PU 106.

Figure 5:
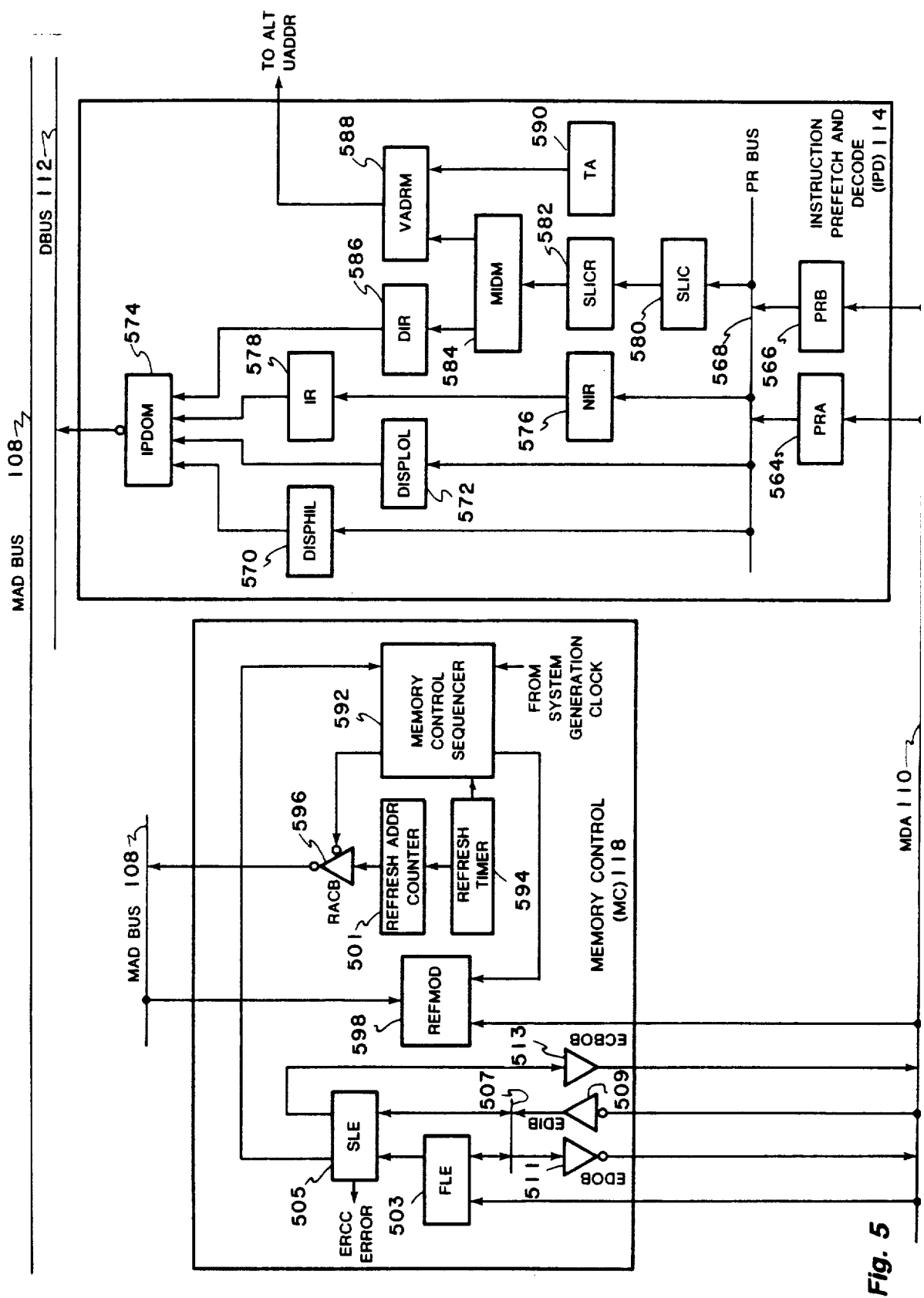
FIGS. 5 and 5A are a detailed block diagram of the present system control unit.
Figure 5A:
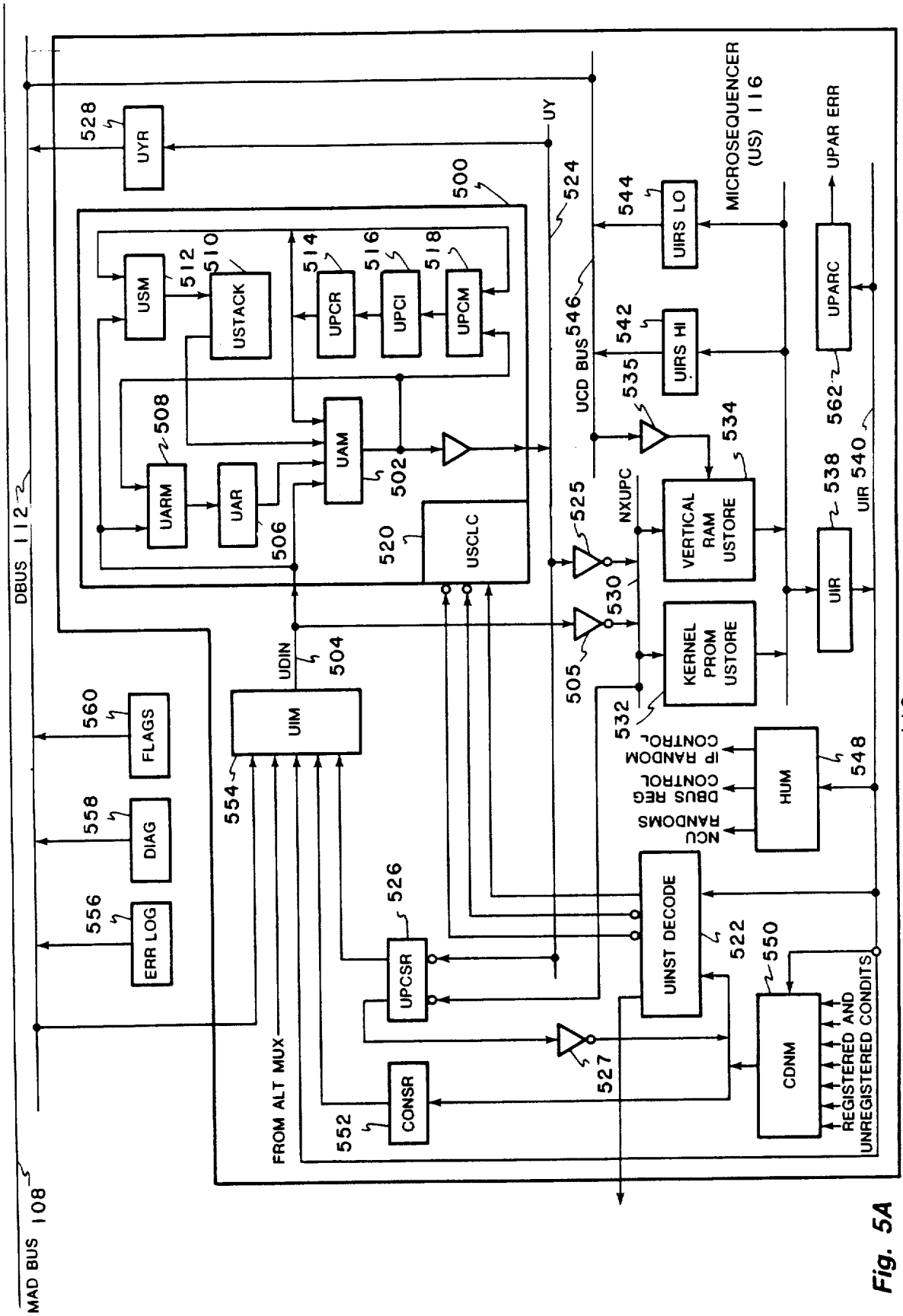
Figure 6:
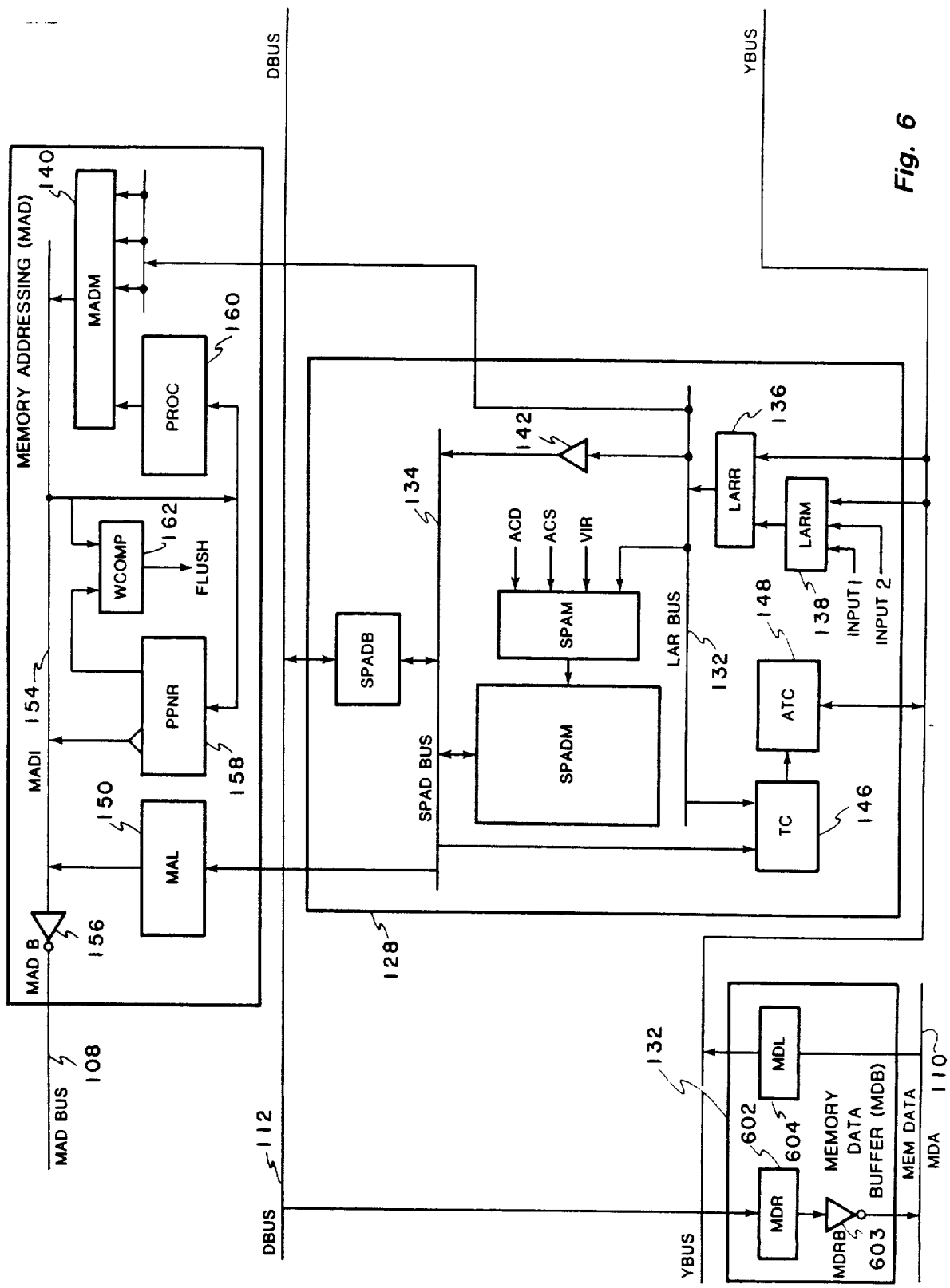
FIGS. 6. and 6A are a detailed block diagram of the present system processor unit.

Referring to FIGS. 5, 5A, 6 and 6A, these figures comprise a detailed block diagram of CU 104 and PU 106. FIGS. 5 and 5A present CU 104 and FIGS. 6 and 6A present PU 106. FIGS. 5, 5A, 6 and 6A may be placed side to side, in that order from left to right, to comprise a complete detailed block diagram of CU 104 and PU 106. For purposes of certain of the following discussions, it will be assumed that the reader has so assembled FIGS. 5 and 6 into such a block diagram.

A. CU 104 (FIGS. 5 and 5A)

Referring to CU 104 in FIGS. 5 and 5A, as previously described the major elements of CU 104 are Microsequencer (US) 116, Instruction Prefetch and Decode (IPD) 114, Memory Control (MC) 118, and System Clock Generator (SCG) 120. These elements will be described next below in that Referring to US 116, US 116 contains CS 101's microcode control logic, including microcode memories for storing microinstruction sequences for controlling operation of CS 101, microcode sequencing control logic for selecting and manipulating microinstruction sequences, and condition logic for providing microinstruction control of CS 101 in response to certain conditions occurring therein and, for example, branches in microinstruction sequences. Microcode control functions provided by US 116 also include microcode state save and restore mechanisms for use in executing microcode traps and interrupts. In addition to the above functions directly concerned with execution of users programs, US 116 also provides all console control functions through the provision of microcode therein directly responsive to commands entered through a soft console, that is, a user keyboard as opposed to front panel switches.

As will be described further below, US 116 microcode resides in three microcode memories, reflecting the microcode organization of CS 101. A first microcode set, referred to as kernel microcode, resides permenently in US 116, as does horizontal microcode. Vertical microcode is not permanently resident in US 116. That is, vertical microcode is stored in Random Access Memories (RAMs) comprising writable control store and are loaded into CS 101 at system startup. Briefly, kernel microcode resides permenently in US 116, and in addition to providing console and other functions, is available at system startup to perform system initialization, including loading of vertical microcode. Typically, vertical microcode will reside in external memory devices, such as disk memories. At time system's initialization, vertical microcode is read from external memory and, under control of kernel microcode, is transferred into MEM 102 a file to reside therein. Then, still under control of kernel microcode, vertical microcode is read from MEM 102 and loaded into vertical microcode memory in US 116. At that time, the full functionality of CS 101 is available.

The core of US 116's microsequencer is comprised of Microsequence Control Logic (USCL) 500. USCL 500 is comprised, for example, of 4 AMD AM2930 bit-slice program control units connected in parallel. USCL 500 includes logic to implement Microprogram Count (UPC) increment, a seventeen word deep last in first out stack, a separate register as a source of microinstruction addresses, an input port for jumping out of sequential microprogram execution, and an output port for providing microinstruction addresses to US 116's microcode memories. USCL 500 also includes an internal microprogram control unit for controlling operation of USCL 500.

USCL 500's microinstruction address output is provided from the output of Microinstruction Address Multiplexer (UAM) 502. UAM 502 is provided with a first input from USCL 500's input, which is connected from Microinstruction Input (UIN) Bus 504. A second input of UAM 502 is connected from Microinstruction Address Register (UAR) 506, whose input is connected from Microinstruction Address Register Multiplexer (UARM) 508. UARM 508 is provided with a first input connected from USCL 500's input, that is, from UIN Bus 504, and a second input from output of UAM 502. UAM 502's third input is connected from output of Microstack (USTACK) 510; as described above, USTACK 510 is a seventeen word deep last in first out stack. USTACK 510 has a first input connected from UIN Bus 504 and a second input connected USCL 500's microprogram counter, described next below. UAM 502's fourth input is similarly connected from the output of USCL 500's microprogram counter.

USCL 500's microprogram counter includes Microprogram Counter Register (UPCR) 514 whose output is connected to inputs of UAM 502 and USM 512. Input of UPCR 514 is connected from output of Microprogram Count Increment (UPCI) 516, which has an input connected from Microprogram Count Multiplexer (UPCM) 518. Inputs of UPCM 518 are connected from the output of UAM 502 and from the output of UPCR 514. UPCM 518 allows an initial microcode starting address to be loaded from output of UAM 502 and into UPCR 514 through UPCI 516. Thereafter, Microprogram Count (UPC) may be sequentially incremented by transferring current UPC from output of UPCR 514 and through second input of UPCM 518 to UPCI 516; current UPC may then be incremented by one by UPCI 516 and the resulting next sequential UPC loaded into UPCR 514. Other operations of USCL 500 in generating microinstruction addresses for US 116's microcode memories will be described further below.

Finally, USCL 500 includes internal microcode control logic USCLC, which USCLC receives and decodes control and instruction inputs from Microinstruction Decode (UID) 522, which will be described below, to control operation of USCL 500.

Referring to the output of USCL 500, 16 bit microcode address output of UAM 502 is connected to UY Bus 524. UY Bus 524 in turn provides a single bit input to Microprogram Counter Save Register (UPCSR) 526 and a sixteen bit input to UY Register (UYR) 528. UYR 528 in turn provides a sixteen bit output to D Bus 108.

Sixteen bit UY Bus 524 is connected, through a buffer, to sixteen bit Next Microprogram Counter (NXUPC) Bus 530. NXUPC Bus 530 also receives, through a buffer, a sixteen bit input from UIN Bus 504. NXUPC Bus 530 provides sixteen bit address inputs to Kernel Microcode Memory (KUM) 532 and Vertical Microcode Memory (VUM) 534. NXUPC Bus 530 also provides a fifteen bit input to UPCSR 526.

Referring to KUM 532 and VUM 534, thirty-two bit microinstruction outputs of kernel and vertical microcode memories are provided to Microcode Output (UCO) Bus 536. Thirty-two bit input of Microinstruction Register (VIR) 538 is connected from UCO Bus 536, and thirty-two bit output of UIR 538 is connected to Microinstruction Register (UIR) Bus 540. As will be described further below, kernel and vertical microinstructions are distributed to other portions of CS 101 from UIR Bus 540.

Returning to UCO Bus 536, UCO Bus 536 provides sixteen bit microinstruction inputs to Microinstruction Save High Register (UIRSHI) 542 and to Microinstruction Save Low Register (UIRSLO) 544. Sixteen bit microinstruction outputs of UIRSHI 542 and UIRSLO 544 are connected to D Bus 112. Certain bits of thirty-two bit UCD Bus 546 are provided as data input to VUM 534 through Buffer 535.

Returning to UUR Bus 540, UIR Bus 540 provides an address input to Horizontal Microcode Memory (HUM) 548. As described above, and described in further detail below, HUM 548 stores and provides horizontal extensions to vertical microcode dealing with random control of CU 104, IPD 114, and D Bus 112, among other functions. UIR 540 also provides certain selected microinstruction bits as inputs to UID 522. UID 522 in turn provides instruction and control outputs to USCL 500 and to SCG 120.

UIR Bus 540 also provides control inputs to Condition Multiplexer (CONM) 550. Data inputs to CONM are registered and unregistered conditions occurring at various points throughout CS 101. CONM 550's output is provided as an input to UID 522 and as an input to Condition Save Register (CONSR) 552. An output of UPCSR 526 is connected through a buffer to the output of CONM 550 so that UPCSR 526's output may be provided to the same inputs of UID 522 and CONSR 552 as the output of CONM 550.

Finally, certain of UIR Bus 540's thirty-two microinstruction bits are provided as one of five inputs to Microinsturction Multiplexer (UIM) 554. UIR Bus 540's input to UIM 554 is, as will be described further below, provided to implement out of sequence jumps to new microinstruction addresses while executing microinstruction sequences.

Referring to UUM 554, UIM 554's output is connected to UIN Bus 504 and UIM 554's inputs are connected to various sources used, as described below, to select microinstruction sequences to be executed by US 116 and, therefore, CS 101. As just described, one input of UIM 554 is connected from certain bits of UIR Bus 540. Another input of UIM 554 is connected from D Bus 112, yet another input is connected from CONSR 552, and another input connected from UPCSR 526. Finally, a last input of UIM 554 is, as will be described in detail below, connected from an output IPD 114.

Referring finally to the upper portion of US 116, therein are represented three registers having outputs connected to D Bus 112. These registers are provided to store certain conditions and flags occurring in CS 101, for subsequent transfer on to D Bus 112. A first register is Error Log Register (ERRLR) 556, a second register is Diagnostic Register (DIAGR) 558, and a third register is Flag Register (FLAGR) 560.

Having described the overall structure of US 116 and certain features of the operation thereof, the operation of US 116 will be described in further detail next below.

B. US 116 OPERATION

1. Introduction

As described above, USCL 500 provides functionality for microprogram control and selection operations. Input to USCL 500 is through UIM 554 and UIM Bus 504 while USCL 500's output is through NXUPC Bus 524.

Referring first to USCL 500's input through UIM 554 and UIN Bus 504, UIM 554 is provided with inputs from five sources. A first input source for UIM 554 is from D Bus 108 and provides, for example, instruction from IPD 114. A second source is from UIR Bus 540 and is utilized for jumping to nonsequential microinstruction addresses in microcode memory. A third source is from IPD 114, described below, and is used for certain instruction pre-execution operations and certain preliminary operations regarding addressing from instruction. A fourth source is a microcode conditional input comprised of selected portions of UIM 554's inputs from UPCSR 526 and UIR Bus 540. Finally, the fifth source is again a conditional input provided by the output of UPCSR 526.

Referring to NXUPC Bus 530, either UY Bus 524, which is USCL 500's direct output, or UIM Bus 504 may be selected to drive NXUPC Bus 530 and thereby directly address KUM 532 and VUM 534.

For a microinstruction fetch, that is, a microinstruction read from microinstruction memory, either KUM 532 or VUM 534 is enabled, based upon the state of a Kernel Flag (KFLAG) stored in FLAGR 560 and asserted during fetch operations. If KFLAG is asserted, fetch is from KUM 532 and, if KFLAG is not asserted, fetch is from VUM 534. KFLAG may be set, or asserted, for example, on system initialization or upon occurrence of a microparity error, as described below. KFLAG may be loaded into KFLAGR 560 as a bit output from VIR Bus 540 through operation of an NCU random control output provided from HUM 548.

The 32-bit outputs of KUM 532 and VUM 534 are ORed together on UCO Bus 536 and are loaded into UIR 538 at the end of each microinstruction read cycle to appear on UIR Bus 540. KUM 532 and VUM 534 outputs may each be selectively disabled for this ORing operation. All microcode visible operations of CS 101 are controlled by the 32 bit microinstruction appearing on UIR Bus 540 from UIR 538.

In addition to being loaded into UIR 538, microinstruction outputs apprearing on UCO Bus 536 may be loaded into and saved in UIRSHI 542 and UIRSLO 544. Outputs of UIRSHI 542 and UIRSLO 544 may then be transferred onto D Bus 112 to allow reading of kernel and vertical microcode memories.

As will be described further below, all microinstructions appearing at UIR 538 output on VIR Bus 540 are checked for error by operation of Microparity Checker (UPARC) 562, which is connected from UIR Bus 540.

As described above, each microinstruction output appearing on UIR Bus 540 from UIR 538 contains 32 bits of microcode control information. Although there is certain overlap of functions controlled by various microinstruction fields, certain portions of each microinstruction may be generally described as controlling certain CS 101 functions. For example, in general UIR Bus 540 bits 0 and 3 through 30 are provided to PU 106 to control all PU 106 microcode visible functions. UIR Bus 540 bits 7 through 13 may be used to select a detected and registered condition occurring in CS 101 to be tested during a current microinstruction cycle. For this purpose, bits 7 through 13 from VIR Bus 540 are provided as control inputs to CONM 550, which in turn selects conditions to be tested. Other microcode controlled functions will be described further in the following descriptions.

Having described the general operation of US 116, certain features of US 116 operation will be described in further detail next below.

2. Basic Microinstruction Fetch

A microinstruction cycle is defined, for purposes of the following descriptions, as the time between consecutive CS 101 clock cycles and is the period of time during which single microinstruction functions are executed. In general, during each microinstruction cycle the microinstruction is fetched from either KUM 532 or VUM 534 and a previously fetched microinstruction stored in UIR 538 is executed.

The following presents a typical sequence of steps occurring in US 116 during consecutive microinstruction cycles:

(1) USCL 500 has placed on UY Bus 524 a microinstruction memory address specified by decode of the certain bits (0–6) currently appearing on UIR Bus 540 and the output of CONM 550. Information appearing on CONM 550's output from CONM 550 and UPCSR 526, may include the contents of UPCSR 526, information indicating the current top of USTAC 510, the contents of UAR 506, or on input appearing on UIN Bus 504.

(2) The microcode address appearing on UY Bus 524 is incremented by UPCI 516 and the incremented microprogram count loaded into UPCR 514. In all microsequencer operations, except certain operations described below, the microcode address appearing on UY Bus 524 is transferred onto NXUPC Bus 530 to address either KUM 532 or VUM 534. Therefore, UPCSR 526 will contain the address of the currently executing microinstruction plus one.

(3) A new microinstruction addressed by the address presently appearing on NXUPC 530 is loaded into UIR 538.

(4) The address presently appearing on NXUPC 530 is loaded into and saved in UPCSR 526, so that UPCSR 526 always contains the address of the currently executing microinstruction except on a TRAP condition as described below.

(5) The output of CONM 550 from the microcycle just ending is loaded into CONSR 552.

(6) US 116's pointer to the top of the microstack residing in USTACK 510 is changed if the current US 116 operation specified in the cycle just ending has affected US 116's microstack.

(7) The contents of UAR 526, whose operation is described further in following descriptions, is changed if the US 116 operations specified in the microcycle just ending has affected UAR 506, or if other operations, described below, occurred during the same microcycle.

Having described a typical microinstruction cycle sequence, US 116 operation for TRAPS will be described next below.

3. Trap Operation

A TRAP condition occurs during execution of microcode when an exceptional condition occurs and it is desirable to stop the execution of a microinstruction in progress, service the exceptional condition, and then resume execution of microcode from the suspended microinstruction. A TRAP process must save sufficient machine state so that the stopped microinstruction may be restarted. For those TRAPs that can be serviced entirely by microcode, the two pieces of state information that must be saved in US 116's microstack residing in USTACK 510 are, (1) address of the stopped microinstruction; and
(2) the output of CONM 550 from the stopped microinstruction; that is, all conditions currently present.

CONM 550 output must be saved because the inputs to CONM 550 are registered, or stored, state that may change during servicing of a TRAP condition and the microinstruction which was interrupted must recover the correct conditions selected upon resuming.

A signal, TRAP is asserted by IPD 114 During execution of any microinstruction which is to be suspended. This event causes the following to occur:

(1) Clock to all CS 101 registers under explicit microcode control is stopped so that these registers are not loaded with altered information during servicing of the TRAP condition;

(2) USCL 500's control input from UID 522 is forced into a state to force USCL 500 to do a jump operation to a TRAP handling microinstruction sequence; and (3) Control input to UIM 554 is forced to the appropriate state to select UIM 554's input to be that provided from IPD 114.

The address of a TRAP handling microinstruction sequence is provided to UIM 554's input from IPD 114 by either CU 104 or PU 106, depending upon whether CU 104 or PU 106 is the source of the TRAP signal. If both CU 104 and PU 106 have provided TRAP signals, then a priority mechanism will determine the TRAP handling microinstruction sequence to be selected. A TRAP handling address is the starting address of a TRAP handling microinstruction sequence and is placed directly upon NXUPC Bus 530 from UIN 504 through Buffer 505.

At the end of a microcycle in which a TRAP condition occurs, the following occurs:

(1) UIR 538 is loaded with the microinstruction beginning the TRAP handling microinstruction sequence;

(2) UPCSR 526 is not loaded with the microinstruction address appearing on NXUPC Bus 530; UPCSR 526 will therefore contain the address of the trapped, that is, interrupted, microinstruction during the first microinstruction of the TRAP handling microinstruction sequence;

(3) The output of CONM 550 is loaded into CONSR 552.

At conclusion of handling of the TRAP condition the original state of execution of the interrupted microinstruction sequence is restored, using information retained in UPCSR 526 and CONSR 552 and through the state save/restore mechanism described next below.

4. Basic State Save/Restore Mechanism

US 116's Basic State Save/Restore Mechanism is USCL 500's microstack residing in USTACK 510.

During the first microinstruction cycle of a trap handling microinstruction sequence, signal TRAP is not asserted and any the information stored in UPSCR 526 may change state. The first microinstruction cycle of a TRAP handling microinstruction sequence must therefore do a state save/restore operation to save current state of US 116 and USTACK 510. During this operation, the contents of CONSR 552, that is, previous conditional states of execution, and the contents of UPSCR 526, that is, the address of interrupted microinstruction, are transferred through UIM 554 and onto UIN Bus 504. This state information is then transferred through USM 512 and onto the top of microstack residing in USTACK 510, thereby saving the conditions and address of the interrupted microinstruction.

If a TRAP may be totally handled by a microcode, no further microsequencer state save is required. Resuming execution of the stopped microinstruction is accomplished by leaving the saved condition state and microinstruction address at the top of microstack residing in USTACK 510 and performing a resume operation which "pops" the top entry in USTACK 510. A "pop" operation fetches the stopped microinstruction while reading the saved condition state information from top of microstack and transferring this information from top of microstack through UAM 502 and into UPCSR 526. Saved condition state is a single bit of information from UPCSR 526 and which represents the saved output of CONM 550. After being transferred into UPCSR 526, and during re-execution of the interrupted microinstruction, the saved condition state information is transferred onto CONM 550's output through Buffer 527, thereby providing saved condition state information to CONSR 552 and UID 522. Saved address of the interrupted microinstruction is concurrently transferred through UAM 502, UPCM 518 and UPCR 516 to UPCR 514. At this point execution of the interrupted microinstruction may be resumed.

Having described US 116's basic state save/restore mechanism, US 116's state save/restore mechanism for conditions requiring assistance from macrocode, that is, from instruction stored in MEM 102, will be described next below.

5. Macroinstruction Assisted State Save/store Mechanism

When a trap condition occurs requiring macrocode assistance for handling, the trap handler must save all microsequencer state and other PU 106 state in MEM 102 rather than in USTACK 510's microstack. State saved in such conditions includes the current contents of USTACK 510's microstack including the address of the currently executing microinstructions and current state condition information pertaining to the interrupted microinstruction, and the current contents of UAR 506 As in the case described above, current condition from CONSR 552 and UPCSR 526 are first pushed onto USTACK 510. Full state save then saves the contents of USTACK 510 and MAR 506 in MEM 102.

Current state conditions and current microinstruction address are read from CONSR 552 and UPCSR 526, respectively, and through UIM 554 to UIN Buss 504. This information, together with information from UAR 506 and the contents of USTACK 510's microstack, are read through UAM 502 and UY Bus 524 into UYR 528. State information so read from US 116 may then be transferred through D Bus 112 to MEM 102, or to scratch pad memory in PU 106, described in a following description of PU 106.

State restore is accomplished by reading US 116's saved state information from MEM 102, or scratch pad memory in PU 106, to D Bus 112. This information is then transferred into UIM 554's input from D Bus 112, and onto UIN Bus 504. The saved contents of UAR 506 and USTACK 510 may then be transferred through UARM 508 to UAR 506 or through USM 512 to USTACK 510. Once completed, the saved condition state and interrupted microinstruction address will be the top entry in USTACK 510 and the interrupted microinstruction may be resumed as described in section 3 above.

6. Reading and Writing Microcode Memory

As previously described, CS 101 implements vertical microcode in a writable control store, that is, VUM 534. A means, described next below, is provided to write vertical microcode from external memory to MEM 102 and from MEM 102 to VUM 534. This means also allows the contents of VUM 534 and and KUM 532 read from VUM 534 or KUM 532 to D Bus 112, for example, to verify microcode residing in VUM 534 or KUM 532 or to be read as a source of literal data. This mechanism operate under microcode control and the functions described may be performed under control of microcode provided from either KUM 532 or VUM 534.

During a microcode write to VUM 534, or a microcode read from VUM 534 or KUM 532, USCL 500 is forced to perform a conditional microinstruction jump to the appropriate microinstruction sequence, by means of a microcode input to UID 522 and a corresponding instruction to USCLC 520. Microcode memory read and write addresses are provided to NXUPC Bus 530 from UAR 506 through UAM 502 and UY Bus 524. UAR 506, in turn, is provided with read and write addresses from D Bus 112 through UIM 554 and UIM Bus 504.

In microcode write operations to VUM 534, microinstruction words are provided on D Bus 112 and are transferred through UCD Bus 546 to VUM 534's data input through Buffer 535. In microcode read operations from either KUM 532 or VUM 534, microinstruction words are read from KUM 532 or VUM 534 onto UCO Bus 536 and into UIRSHI 542 and UIRSLO 544. Microinstruction words may then be transferred from UIRSHI 542 and UIRSLO 544 to UCD Bus 546 and to D Bus 112.

7. Microcode Parity Errors

Each microinstruction provided by KUM 532 or by VUM 534 is a 32 bit word comprising 31 bits of microcode information, plus 1 parity bit which is set to preserve odd parity. Parity of each microinstruction appearing in UIR 538 is checked by UPARC 562 after each fetch of a microinstruction from KUM 532 or VULM 534. If a parity error occurs, UPARC 562 will initiate a microparity error trap that prevents execution of the microinstruction in error and transfers control to Kernel microcode in KUM 532 for error handling.

8. Crossing Instruction Boundaries

In the above descriptions, IPD 114 was described as the source of instructions to be executed by means of corresponding microinstruction sequences provided by US 116. An instruction boundary is crossed when the microinstruction sequence corresponding to a first instruction is ended, for example, by completing execution of the sequence or because of a trap condition, and execution of a second instruction is initiated. Microinstruction sequences provided by US 116 provide a mechanism for initiating the execution of new instructions.

End of execution of a current instruction may be indicated by the appearance in UIR 538 of a particular microinstruction in the corresponding microinstruction sequence. If such an end of execution microinstruction occurs, UID 522 and USCLC 520 provide an instruction to USCL 500 to jump to a state for receiving a next instruction. At this time, UIN 554 is instructed to accept as input to UIN Bus 504 UIM 554's input from IPD 114. IPD 114 will then provide, through UIM 554 and UIM Bus 504, the starting address in microinstruction memory of the next instruction to be executed.

If an interrupt is pending, or if the next instruction has not yet been fetched, or if any one of several other conditions occurs, a next instruction may not appear or be available. IPD 114 will then provide to UIM 554 the address in, microinstruction memory of an appropriate routine to handle the existing condition.

9. Soft Console

As previously described, CU 101 incorporates a "soft console". That is, operator console type commands may be entered through a terminal rather than through front panel switches. US 116 will detect the initiation of such a console command entry by means of a non maskable interrupt initiated by an initial console command. Upon such occurrence, an address will be forced at UIM 554's input from IPD 114 which, provided to USCL 500 and thus to NXUPC Bus 530, is the initial address in KUM 532 of console microcode sequences stored therein.

As previously described, at system initiation US 116 microcode memory contains only kernel microcode. In a present embodiment of the present invention, kernel microcode includes at least a portion of the NOVA instruction set microcode and is responsive to single character commands provided from a terminal through SIO 120. Vertical microcode include microcode for the full NOVA, ECLIPSE and MV/8000 instruction sets and is responsive to multiple character commands provided from a terminal through SIO 120. CS 101 thereby provides a limited "raft" console, that is, from a terminal, at system start-up, and full console functions after vertical microcode has been loaded.

Having described the structure and operation of US 116, the structure and operation of IPD 114 will be described next below.

Instruction Prefetch and Decode (IPD) 114 (FIGS. 5, 5A)

As indicated in FIG. 5 and 5A, and as previously described, IPD 114 is connected between memory data (MDA) Bus 110 and D Bus 112 with an output to an input of UIM 554 in US 116. IPD 114 operates as aan up to four instruction deep instruction prefetch, and as an initial instruction decoder. Some typical formats of instructions used in CS 101 have been previously described with reference to FIG. 2.

1. Structure of IPD 114

Referring to IPD 114, 16 bit Prefetch Register A (PRA) 564 and 16 bit Prefetch Register B (PRB) 566 have inputs connected from MDA Bus 110. 16 bit outputs of PRA 564 and PRB 566 are connected to 16 bit Prefetch Register (PR) Bus 568.

PR Bus 568 is connected to 16 bit input of Displacement High Latch (DISPHIL) 570 and to 16 bit input of Displacement Low Latch (DISPLOL) 572. 16 bit outputs of DISPHIL 570 and DISPLOL 572 are connected to first and second 16 bit inputs of IPD Output Multiplexer (IPDOM) 574.

Next Instruction Register (NIR) 574 has a 16 bit input connected from PR Bus 568 and 16 bit output connected to 16 bit input of Instruction Register (IR) 578. IR 578 in turn has a 16 bit output connected to a third input of IPDOM 574.

Finally, PR Bus 568 is connected to 16 bit input of Single Level Instruction Cracker (SLIC) 580. 9 bit output of SLIC 580 is connected to the input of 9 bit Single Level Instruction Cracker Register (SLICR) 582, and 9 bit output of SLICR 582 is connected to input of Macroinstruction Decode Memory (MIDM) 584.

A first output of MIDM 584 is connected to the input of Decoded Instruction Register (DIR) 586. A first output of DIR 586 is connected to a fourth input of IPDOM 574 and in part controls IPDOM 574 Second outputs of DIR 586 are provided to other portions of CS 101, as will be described in following descriptions.

A second output of MIDM 584 is connected to a first input of Microinstruction Address Multiplexer (UADRM) 588. A second input of UADRM 588 is connected from Trap Addresses (TA) 590.

Finally, IPD 114's first output, from output of IPDOM 574, is connected to D Bus 112 while IPD 114's second output, from output of UADRM 588, is connected to the previously described input of UIM 554 in US 116.

Having described the overall structure of IPD 114, the operation of IPD 114 will be described next below.

2. IPD 114 Operation

As has been previously described, a typical instruction of CS 101 may contain 32 bits, including 16 bits of instruction information (opcode field) and 15 or 16 bits of address displacement information (displacement field). Certain instructions, however, will have a total length of 16 bits or will have a double word displacement field of 32 bits, for a total of 48 bits. As also previously described, and as will be further described in following descriptions, all writes to and reads from MEM 102 by CS 101 are of double words, that is, of two 16 bit words at a time. Upon each read from MEM 102, therefore, PRA 564 and PRB 566 will receive a 32 bit double word from MDA Bus 110, with one 16 bit word being received in PRA 564 and the other 16 bit word being received in PRB 556. A Prefetch Register (PR) pointer generated by US 116 indicates, at any time, which of PRA 564 or PRB 566 presently contains or will contain a 16 bit instruction information of a current instruction field or which contains or will contain displacement field information.

Instruction displacement field information may be transferred from either PRA 564 or PRB 566 PR Bus 568 and toeither of DISHIL 570 or DISPLOL 572. Diplacement field information may then be transferred from DISPHIL 570 or DISPLOL 572 and through IPDOM 574 to D Bus 112 for use by PU 106 in addressing data referenced by an instruction. Two displace field latches, that is, DISPHIL 570 and DISPLOL 572, are provided to enable displacement field information to be transferred to PU 106 in a single cycle for 15, 16 or 32 bit displacement fields.

Instruction information fields may be transferred from either PRA 564 or PRB 566 to PR Bus 568 and NIR 576 and in turn to IR 578. From IR 578, instruction information fields may be transferred, simultaneously with the corresponding decoded output of SLIC 580 to SLICR 582, through IPDOM 574 to D Bus 112 and thereby to US 116 through UIM 554 to select corresponding microinstruction sequences to be executed by CS 101. NIR 576 and IR 578, together with PRA 564 and PRB 566, provide an up to four instruction deep prefetch mechanism, allowing CU 104 to fetch instructions in advance of the instruction currently being executed.

Certain of CS 101's instructions cannot be executed immediately as received from MEM 102. For example, instructions will frequently require additional processing of the instructions addressing information before the data referenced by the instruction can be fetched from MEM 102. Additionally, due to the variety of instruction formats used by CS 101, CS 101 and US 116, in particular, must perform certain preliminary operations in order to properly interpret and respond to instructions.

The instruction cracking and decoding circuitry provided by SLIC 580 and MIDM 584 and related logic provides a mechanism for interpreting instructions. First, SLIC 580 examines the 16 bit instruction information field of each instruction and extracts therefrom 9 bits, depending upon the instruction format, defining the operation to be performed. A first output is a 9 bit predecode address which is provided as an input to MIDM 584, described below. A second, 2 bit, output defines the index made for the instructions being decoded and other output may define the instruction class. The information so extracted includes information relating to data addressing, such as data width, displacement type and instruction width.

MIDM 584 is a read-only-memory addressed by the 9 bit output of SLIC 580 and providing appropriate control outputs. MIDM 584's first output to DIR 586 provides information relating to data width, displacement type and data length. MIDM 584's second output, to UADRM 588 provides to US 116 the starting microaddress of microinstruction sequences to be executed, as previously described in the description of US 116.

UADRM 586's second input, from TA 590, provides information to UIM 554, and thus to US 116, regarding the starting microaddress of microinstruction sequences to handle trap conditions occuring in CS 101, as previously described.

Having described the structure and operation of IPD 114, the structure and operation of MC 118 will be described next below.

Figure 7:
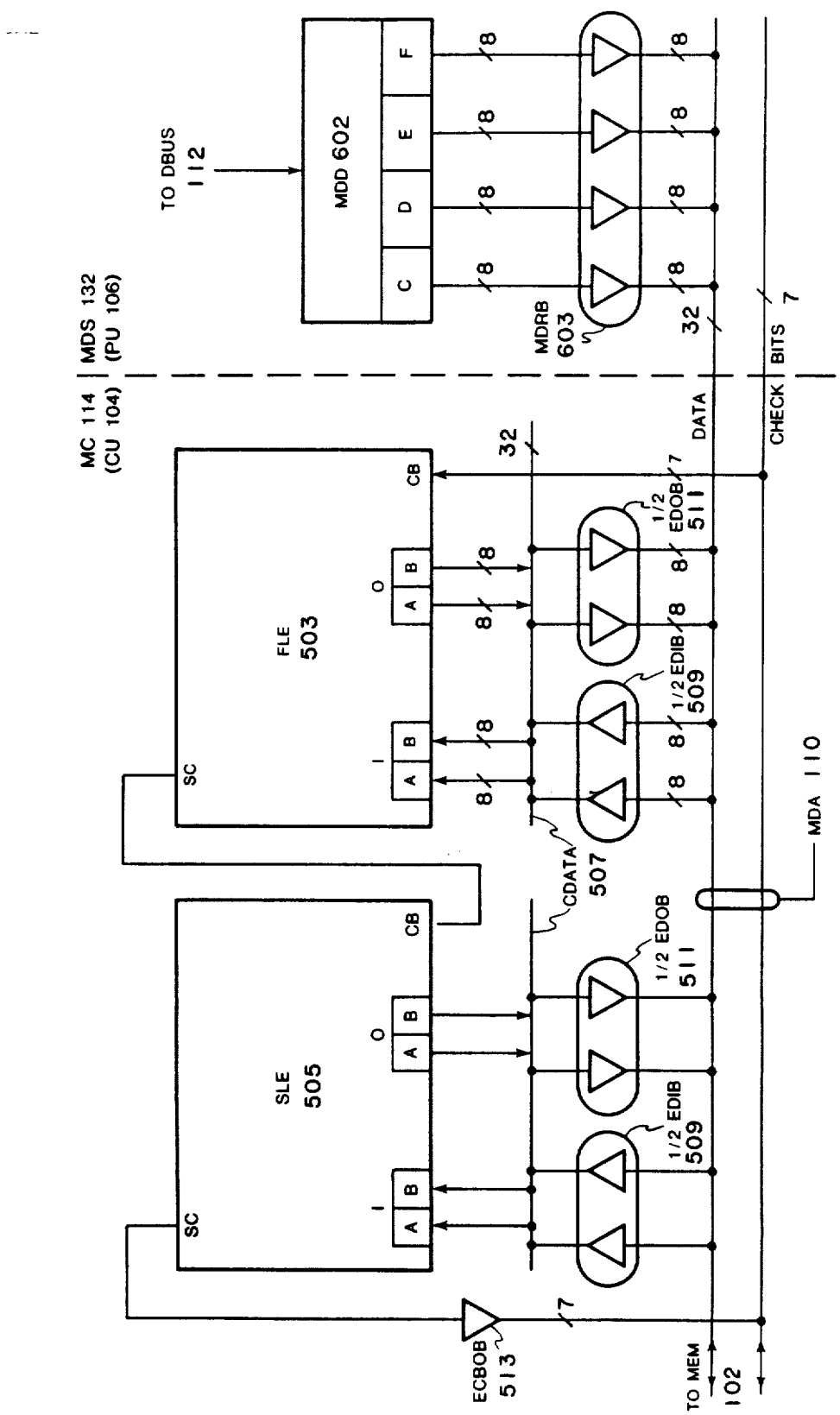
FIG. 7 is a detailed block diagram of a portion of a memory control unit.

3 Memory Control (MC) 118 (FIG. 5, 5A and 7)

MC 118, as previously described, performs interface functions between CU 101 and MEM 102. MC 118 is a "look aside" interface device, that is, is connected in parallel from MAD Bus 108 and MDA Bus 110, rather than being connected in series in these buses between CS 101 and MEM 102. MC 118 operates, however, as if connected in series in MAD Bus 108 and MDA Bus 110 between CS 101 and MEM 102. MC 118 allows CS 101 and MEM 102 to share the same address and data signals on MAD Bus 108 and MDA Bus 110 while, at the same time, allowing CS 101 and MEM 102 to have different interface protocols.

In addition to performing translation between CS 101's memory bus protocol and MEM 102's memory bus protocol. MC 118 provides MEM 102 refresh and "sniffing". Sniffing, as described in U.S. patent application Ser. No. 143,675, filed Apr. 25, 1980, and issued as U.S. Pat. No. 4,380,812, and entitled, "Refresh and Error Detection and Correction Techniques for a Data Processing System", and assigned to common assignee Data General Corporation, and incorporated herein by reference, is a mechanism and method for scanning MEM 102 locations being refreshed, detecting errors therein, and correcting such errors. In addition, MC 118 performs memory error logging. Finally, as previously described with reference to CS 101's addressing mechanisms and in particular CS 101's demand paging mechanism, MC 101 monitors and logs, or records, referenced and modified pages residing in MEM 102.

a. Structure of MC 118

Referring to FIG. 5, MC 118 includes a Memory Control Sequencer (MCS) 592, which provides timing and control for all memory related operations, in particular those of MC 118. MCS 592 has a clock input from SCG 120, a refresh timing input from Refresh Timer (REFT) 594, and an error input from MC 118's ERCC logic, described below. In addition to other control outputs, MCS 592 provides outputs to Refresh Address Counter Buffer (RACB) 596 and to Referenced/Modified Bits Logic (REFMOD) 598.

In addition to a timing output to MCS 592, REFT 594 provides timing output to Refresh Address Counter (RAC) 501. RAC 501 in turn provides refresh address outputs to RACB 596, and RACB 596 in turn provides refresh address outputs to MAD Bus 108 under control of the previously described control input from MCS 592.

REFMOD 598, as previously described, monitors and logs referenced and modified pages in MEM 102 as part of CS 101's demand paging system by storing information bits pertaining to referenced and modified pages residing in MEM 102. In addition to a control input from MCS 592, REFMOD 598 includes an input from MAD Bus 108 and a bidirectional connection to MDA Bus 110.

Finally, MC 118 incorporates Error Checking and Correction (ERCC) logic which includes a first level ERCCER (FLE) 503 and a second level ERCCER (SLE) 505. FLE 503 and SLE 505 are implemented with Advanced Microdevices AM 2960s connected in a 32 bit configuration.

MC 118's ERCC logic is provided with an internal data bus, Check Data (CDATA) 507, which allows data to be transferred from MDA Bus 110 to MC 118 ERCC logic, manipulated, and transferred back onto MDA Bus 110. Data is transferred from MDA Bus 110 to CDATA Bus 507 through ERCC Data Input Buffer (EDIB) 509, and from CDATA Bus 507 to MDA Bus 110 through ERCC Data Output Buffer (EDOB) 511.

FLE 503 and SLE 505 each have a 16 bit bidirectional data input/output connection to CDATA Bus 507 for receiving data from and transferring data to CDATA Bus 507. FLE 503 receives 7 bits of check bit (ERCC) information, from MDA Bus 110 through FLE 503's check bit (CB) input connected from MDA Bus 110 and provides a check bit output to check bit input of SLE 505's CB input. SLE 505 provides 7 check bits of ERCC information to MDA Bus 110 through ERCC Check bit Output Buffer (ECBOB) 513. SLE 505 also provides error outputs, as previously described, to MCS 592 and to ERRLR 556 in US 116.

Having described the structure and certain features of the operation of MC 118, certain features of MC 118 will be described further next below.

b. Operation of MC 118

The operation of MEM 102, and MEM 102's interface to MAD Bus 108 and MDA Bus 110 are described in U.S. patent application Ser. No. 441,968, filed of even date herewith on Nov. 15, 1982, and entitled "Universal Memory" and assigned to common assignee Data General Corporation, which is incorporated herein by reference. MEM 102 and MEM 102's interface to CS 101 will thereby not be described further in detail herein.

The following description will pertain to CS 101 and CS 101's interfaces to MAD Bus 108 and MDA Bus 110 and CS 101's functionality with respect to memory operations.

As described above, CS 101 and MEM 102, will have differing interface protocols but share the address and data signals appearing on MAD Bus 108 and MDA Bus 110. Translation between CS 101 and MEM 102 interface protocols involves the control signals exchanged therebetween and manipulation of check, or ERCC, bits appearing on MDA Bus 110. It should be noted that CS 101 may provide 30 bits of address, since, as previously described, CS 101 performs reads from and writes to MEM 102 double words only.

The least significant bit of CS 101's addresses are exchanged to be the least significant bit of the addresses received by MEM 102. This implies that consecutive double words written or read by CS 101 never appear in consecutive locations in MEM 102, allowing faster double word instruction fetches when MEM 102 interleave operation is considered.

MC 118 operations may be divided into two broad classes, read operations and write operations. Read and write operations differ in that read operations may be pipelined, whereas write operation may not, due to the operation of the MEM 102. That is, address and control signals for a next read operation may be sent to MEM 102 while reading and checking the data read from MEM 102 in a present read operation. All data control and address control functions for a present write operation must, however, be fully completed before initiating a subsequent write operation.

MCS 592 may be regarded as performing two mutually dependent operations with regard to memory read and write operations, address control and data control. Address control monitors operation of MEM 102 through control signals provided from MEM 102, initiates addressing operations, determines acceptance of addresses by MEM 102, and generates control signals to initiate operation of MCS 592's data control logic on information transfers. MCS 592's address control also monitors refresh operations, to allow sniffing operations.

MCS 592's data control logic generates all data control signals for MEM 102's CS 101's interfaces to MAD Bus 108 and MDA 110. MCS 592's data control logic also generates all control signals for MC 118 ERCC functions and monitors the ERCC outputs of MC 118's ERCC logic.

As described above, MC 118 performs refresh operations upon information stored in MEM 102. Refresh is performed through "cycle stealing" operations, wherein MC 118's refresh control circuitry takes control of MAD 108 and MDA Bus 110 at periodic intervals to refresh successive portions of MEM 102's address space. REFT 594 generates a refresh request signal at periodic intervals and, at time of a refresh cycle, increments RAC 501 to generate successive refresh addresses. RAC 501 generates 21 bit addresses specifying double words to be read and checked for errors.

A sniff operation, that is examining information stored in MEM 102 in storage locations currently being refreshed for error checking and correction, begins by requesting a refresh cycle. During refresh cycle, MC 118 takes control of MAD Bus 108 and MDA Bus 110 and asserts a refresh address from RAC 501 through RACB 596 to MAD Bus 108. Information read from corresponding locations in MEM 102 is checked for errors, while CS 101 is allowed to continue making memory references. If a correctible error is found, a refresh write back operation is initiated. A refresh write back operation is performed in the same manner as the original refresh except that the information is corrected and written back.

When RAC 501 generates an address greater than the present address space of MEM 102, that address will address nonexistant memory. When this event occurs, MEM 102 will not generate a signal indicating that the refresh address has been accepted. This event causes RAC 501 to be reset to zero, allowing refresh to start over at the beginning of MEM 102 address space. A refresh and sniff in MEM 102's address zero is performed immediately upon this occurrence.

As described above, ERCC and error logging is accomplished through MC 118's ERCC logic, including FLE 503 and SLE 505. Data inputs to FLE 503 and SLE 505 from MDA Bus 110, and data outputs from FLE 503 and SLE 505 to MDA Bus 110 are isolated from MDA Bus 110 through the bidirectional buffer comprising EDIB 509 and EBOB 511. As described above, CDATA Bus 507 operates as the data portion of MDA Bus 110, but is isolated from MDA Bus 110 by this bidirectional buffer. Check bits, that is ERCC bits appearing on MDA Bus 110, are, however, provided directly to FLE 503's check bit (CB) input from MDA Bus 110. Check bit output SC of MC 118's ERCC logic is provided from check bit output SC of SLE 505 to MDA Bus 110 through ECBOB 513. MCS 592 provides individual and separate controls of all data and check bit transfers through EDIB 509, EDOB 511, FLE 503, SLE 505, and ECBOB 513.

ERCC upon information read from MEM 102 on to MDA Bus 110 is accomplished by reading data bits from MDA Bus 110 and through EDIB 509 to CDATA Bus 507, and thus into FLE 503 and SLE 505, while check bits are read directly into FLE 503. It should be noted that FLE 503 receives the 16 least significant bits of data while SLE 505 receives the most significant 16 bits of data. FLE 503 utilize the check bit inputs from MDA Bus 110 and the 16 least significant data bits received from CDATA Bus 507 to generate an appropriate check bit output to SLE 505 for those check and information bits. SLE 505 in turn utilizes the most significant 16 bits of data from CDATA 507 and the check bit input from FLE 503 to generate a final check bit output.

ERCC upon information read from MEM 102 is performed at the same time that the information is passed on to the requestor, in most cases PU 106. That is, ERCC is performed in parallel with the read operation.

If an ERCC error is detected, a signal halting memory operations is asserted and a correction cycle initiated. During correction cycle, error syndrome bits indicating the error which has occurred are provided at output of SLE 505 and are driven onto MDA Bus 110 through ECBOB 513. From MDA Bus 110, error syndrome bits are transferred into FLE 503, which provides appropriate outputs to the check bit input of SLE 505. FLE 503 and SLE 505 then generate corrected data onto CDATA Bus 507. The corrected data is then transferred through EDOB511 to MDA Bus 110 and thereby to the requester. Because comparitively few read operations will result in correction cycles, the parallel operation of MC 118's ERCC Logic, wherein information is passed on to the requester while ERCC's performed, will result in faster average read operations than will a series ERCC operation.

MC 118's ERCC Logic also generates ERCC bits during write operations to MEM 102. As previously described, all write operations, as are all read operations, are of double words. Data appearing on MDA Bus 110 to be written into MEM 102 is accepted on to CDATA Bus 507 through EDIB 509. FLE 503 and SLE 505 accept this data as inputs and generate corresponding check bits from the output of SLE 505. These write check bits are then transferred onto the check bit portion of MDA Bus 110 through ECBOB 513, and the data and corresponding check bits written into MEM 102.

CS 101 may also perform partial write operations, that is, writes of single words of single bytes.

As described above, all read and write operations of CS 101 from and to MEM 102 are of double words, that is, of two sixteen bit words at a time. As has also been previously described, CS 101 is also capable of generating read and write addresses referencing single words (16 bits) and single bytes (8 bits). The operation of CS 101, and in particular MC 118, in performing single word and byte read and write operations will be described next below.

Referring to FIG. 7, a block diagram of certain portions of CU 104 and PU 106 is shown, in particular CU 104's ERCC circuitry, including FLE 503 and SLE 505 and CDATA Bus 507, and PU 106's MDS 132, in particular MDR 602. In FIG. 7, FLE 503, SLE 505, EDIB 509, EDOB 511, MDR 602, and MDRB 603 have been redrawn to illustrate the operation of these elements in yet greater detail. In particular, MDR 602 and MDRB 603 of MDS 132 are indicated as operating, respectively, as four independently controllable 8 bit registers and buffers, C, D, E, and F, rather than as a single 32 bit register and buffer. In FLE 503 and SLE 505, input latches I have been represented as each comprising two independently controllable 8 bit latches A and B, while output latches O have been similarly represented as each comprising two independently controllable 8 bit latches, A and B. Similarly, EDIB 509 is represented as comprising four independently controllable 8 bit input buffers, while EDIB 511 is represented as comprising four independently controllable 8 bit output buffers. For clarity of presentation of the following description, CDATA Bus 507 is shown as divided in two parts, one part corresponding to FLE 503 while the second part is associated with SLE 505. This division is made for illustrative purposes only and the two halves of CDATA Bus 507 shown in FIG. 7 are in fact a single bus. MDA Bus 110 is represented as being comprised of a 32 bit data bus and a 7 bit check bit bus for ERCC bits.

In as much as CS 101 performs only double word reads from and writes to MEM 102, a write of a single word or byte to MEM 102 is performed as a read, modify and write of a double word. The double word containing th address location of the single word or byte to be written into MEM 102 is read from MEM 102. The double word read from MEM 102 is effectively modified by having the single word or byte written into the appropriate location in the double word, and the double word is then written back into MEM 102. The following will describe the operation of CS 101 in writing a single byte (8 bits) into MEM 102. A single word write, that is, of 16 bits, or two bytes, is performed in the same manner except that two bytes rather than one are written into the appropriate location in the double word.

Referring to FIG. 7, at start of a single byte write operation a double word is read from MEM 102 on MDA Bus 110. Thirty-two data bits appear upon the data portions of MDA Bus 110, while seven check bits appear on the check bit portion thereof. The four 8 bit bytes comprising the 32 bit double word are transferred through the corresponding portions of EDIB 509 to CDATA Bus 507 and into the corresponding A and B portions of FLE 503's and SLE 505's input (I) latches. The check bits are transferred directly into FLE 503's check bit (CB) input. The 32 bit word received from MEM 102 and FLE 503's and SLE 505's I latches are checked for errors, corrected if necessary, and transferred into FLE 503's and SLE 505's four 8 bit output (O) latches A and B.

At the same time, the byte to be written into MEM 102 is loaded into one of MDR 602's four single byte (8 bit) latches, C, D, E, and F, from D Bus 112. The byte to be written into MEM 102 will appear in the one of MDR 602's latches corresponding to the location that the byte is to be written into in the double word initially read from MEM 102. The byte to be written is then transferred from the corresponding byte register of MRD 602 and through the corresponding portion of MDRB 603 to the data portion of MDA Bus 110 and therefrom into the corresponding single byte input latch of FLE 503 or SLE 505. For example, a byte appearing in MDR 602 byte register E could correspondingly be transferred into FLE 503's I latch A, while a byte appearing in MDR 602's latch D would appear in SLE 505's I latch B.

At this time, three of FLE 503's and SLE 505's input latches contain corresponding bytes from the double word originally read from MEM 102 while one of FLE 503's or SLE 505's input latches contains the byte to be written into MEM 102. FLE 503's and SLE 505's input latches thereby contain the modified double word to be written back into MEM 102, that is, the double word containing the byte to be written into MEM 102. FLE 503 and SLE 505 will then generate the new seven check bits for the modified double word. The check bits in modified double word are then transferred to FLE 503's and SLE 505's output latches and on to CDATA Bus 507 and MDA Bus 110 to be written into MEM 102, thereby completing the write of a single byte into MEM 102. As described above, a write of a single word, that is of two bytes at a time, is performed in the same manner as a single byte write operation except that two bytes are received from MDR 602 and used to generate the modified double word.

Finally, as previously described, MC 118's REFMOD 598 operates as part of CS 101's demand paging system by monitoring and storing information relating to referenced and modified pages residing in MEM 102. REFMOD 598 may store information pertaining to up to, for example, 8 megabytes of information storage in MEM 102.

REFMOD 598 stores two different types of information pertaining to each page in MEM 102. First, REFMOD 598 stores, for each page residing in MEM 102, a bit indicating whether the page has been referenced by CS 101, for example, in executing a user's program. Secondly, REFMOD 598 stores, again for each page in MEM 102, a bit indicating whether CS 101 has modified, that is, performed a write operation to, that page in MEM 102. Referenced information bits are updated upon occurrence of each read or write operation to MEM 102, while modified bit information is updated during each write operation. Updating of referenced and modified information in REFMOD 598 is performed under control of CU 104 random control outputs from HUM 548 and US 116 as previousl described. Having described the structure and operation of CU 104, the structure and operation of PU 106 will be correspondingly described next below.

B. PROCESSOR UNIT (PU) 106 STRUCTURE AND OPERATIONS (FIGS. 6 and 6A)

Referring to FIG. 6, a detailed block diagram of PU is shown. As previously described, PU 106 operates under microinstruction control of CU 104 to execute user's programs. That is PU 106 performs all data manipulation and calculation operations, addressing operations, and information transfers between CS 101 and external storage devices.

1. General Structure and Operation of PU 106

As previously described and as shown in FIG. 6, PU 106 includes CPU Processor (CPUP) 122, Nibble Shifter (NIBS) 126, Stratch Pad and Address Translation Unit (SPAD) 128, Memory Addressing (MAD) 130, Memory Data Store (MDS) 132, Serial Input/Output (SIO) 134, and Data/BMC Input/Output (DBIO) 136.

Referring first to CPUP 122, CPUP is a 32 bit processor comprised of 8 four bit Advanced Micro Devices (AMD) 2901C microprocessors connected in parallel. CPUP 122 performs all CS 101 arithmetic operations under microcode control of CU 104. CPUP 122 includes a random access memory (RAM), a shift register/buffer, a register file, an arithmetic and logic unit (ALU), and other registers, shift registers, and multiplexers as needed to perform general purpose data manipulation operations, including arithmetic operations. CPUP 122 further includes internal microcode control, which receives instruction inputs from US 116. CPUP 122 receives two inputs, AREG and BREG from US 116 microcode control output which selects, for certain operations, source and destination registers in CPUP 122's register file. As indicated in FIG. 6, CPUP 122 has a 32 bit data input connected from D Bus 112 and a 32 bit output connected to Y Bus 124. The circuitry comprising CPUP 122 are commercially available components well known to those of ordinary skill in the art, and will not be described further except as required for a more thorough understanding of CS 101 during the following detailed descriptions of other portions of PU 106.

Having described PU 106's CPUP 122, the transmission paths by which information, primarily data and addresses, are transferred between MEM 102 and PU 106, and in particular CPUP 122, will be described next below. These transmission paths include MAD Bus 108, by which read and write addresses are provided to MEM 102 by PU 106, and MDA Bus 110, by which instructions and data are communicated between PU 106 and MEM 102.

Paths internal to PU 106 include D Bus 112 and Y Bus 124. As indicated in FIG. 6, MDS 132 is connected between D Bus 112 and MDA Bus 110 and between MDA Bus 110 and Y bus 124. MDS 132 includes Memory Data Register (MDR) 602, having a 32 bit input connected from D Bus 112 and a 32 output connected through buffer driver MDRB 602 to MDA Bus 110. MBS 132 also includes Memory Data Latch (MDL) 604, which has 32 bit input connected from MDA Bus 110 and a 32 bit output connected to Y Bus 124. Finally, PU 106's internal data path further includes NIBS 126, having a 32 bit input connected from Y Bus 124 and a 32 bit output connected to D Bus 112. MAD 130, comprising PU 106's address output to MAD Bus 108, will be discussed separately further below, in conjunction with the discussion of SPAD 128.

Considering first data transfers from MEM 102 to PU 106, data read from MEM 102 appears on MDA Bus 110 and may be received and stored in MDL 604. That data may be then transferred from MDL 604 to Y Bus 124, and may then be transferred from Y Bus 124 to NIBS 126.

NIBS 126 is a nibble shifter and is capable of either passing data straight through or performing right or left shifts of data on a nibble by nibble basis. NIBS 126 is used, for example, to shift data within words received from MEM 102 into differing formats for subsequent operations by CPUP 122. NIBS 126 may, for example, be further used to reorganize data resulting from operations CPUP 122 into formats selected for storing such data in MEM 102.

As previously described, NIBS 126's output is connected to D Bus 112, so that data appearing on Y Bus 124 may be transferred onto D Bus 112, either directly as a straight through-put or after being operated upon by NIBS 126.

A previously described the output of CPUP 122 is connected to Y Bus 124, so that data generated as a result of CPUP 122 operations may be transferred, through NIBS 126, to D Bus 112. Again, data transferred through NIBS 126 from output of CPUP 122 may be passed directly through NIBS 126 or may be operated upon by NIBS 126. For example, NIBS 126 may perform alignment operations upon data outputs of CPUP 122 in preparation for subsequent write operation to MEM 102.

Data appearing on D Bus 112 may then be transferred into MDR 602 and subsequently transferred through MDRB 603 to MDA Bus 110 and thus written into MEM 102. Alternately, data appearing on D Bus 112 may be transferred into CPUP 122's data input. Data appearing on D Bus 112 may also be transferred through Buffer 606 to DBIO 136 for subsequent transfer to external storage devices.

Before describing SPAD 128 and MAD 130, two further features associated with operation of CPUP 122 will be described next. The first is the use of CPUP 122 to perform increment by two operations and the second is the multiple uses of Temporary Register (TREG) 608, which is bi-directionally connected from D Bus 112.

A common operation, for example, in manipulating addresses and other arithmetic operations, is to increment a given number by two. The AMD 2901Cs utilized in CPUP 122 are, however, not directly capable of performing an increment by two operation. Minus 2 Source (MINUS2) 610 having an output to D Bus 112, and a microinstruction sequence from US 116, allow CPUP 122 to perform increment by two operations. MINUS2 610 is a source for placing on D Bus 112 a 32 bit number having a numeric value of minus 2. CPUP 122 contains the number to be incremented by 2 in its register file. It accepts the minus 2 operand provided by MINUS2 610, and compliments it (giving a +1) and performs an add operation with the number to be incremented to give a number equal to the operand to be incremented plus 1. At the same time, a plus 1 is forced into CPU 122's ALU carry input to provide a further plus 1 increment. The output of CPUP 122's ALU will thereby be the original operand incremented by 2. MINUS2 610 thereby allows CPUP 122 to perform a commonly desired operation not originally provided for by the AMD 2901ccircuits employed therein.

Referring now to TREG 608, TREG 608 is a 32 bit shift register which may be used for temporary storage of data appearing on D Bus 112, from which TREG 608 is connected by a bi-directional 32 bit bus. TREG 608 is further utilized to generate 32 bit long control word sequences for controlling other operations of CS 101. Under microcode control, a 32 bit pattern of ones and zeros is loaded into TREG 608. That 32 bit pattern is then shifted right or left as necessary to generate bit sequences which are used, for example. to perform system resets, to perform timed input/output operations, and to control buffers for programmed input and output operations. TREG 608 thereby provides an extended means for controlling certain operations of CS 101 while utilizing already existing circuitry normally intended for temporary data storage functions.

Referring now to SPAD 128 and MAD 130, SPAD 128, having inputs connected from Y Bus 124, performs address translation and mapping junctions as previously described. SPAD 128, for example, accepts logical addresses from Y Bus 124 and provides corresponding physical addresses to MAD 130. MAD 130 transfers addresses from SPAD 128 to MAD Bus 108. In addition, MAD 130 operates in conjunction with IPD 114 as a prefetch mechanism by generating and providing prefetch read addresses to MEM 102 through MAD Bus 108.

Referring first to SPAD 128, the core of SPAD 128 is SPAD Memory (SPADM) 129. SPADM 129 is a random access memory used in part by PU 106 and CS 101 as a scratch pad memory. SPADM 129 is further utilized to store address mapping information, and thus is a part of CS 101's addressing mechanism. For example, SPADM 129 may be used to store address translation maps for CS 101's data channel, burst multiplexer channel, programmed I/O, through DBIO 136. SPADM 129 is also used to store addressing maps for logical to physical address translations. In addition, SPADM 129 contains CS 101's Segment Base Registers (SBRs), previously described, and a portion of SPADM 129 is utilized as accumulators for floating point operations.

As indicated in FIG. 6, SPAD 128 includes an internal addressing bus, referred to as Logical Address Register (LAR) Bus 132, and a data bus, referred to as SPAD Bus 134. LAR Bus 132 is connected from Y Bus 124 through Logical Address Register (LARR) 136 and Logical Address Register Multiplexer (LARM) 138. LARR 136 has a 32 bit output to LAR Bus 132 and has inputs from Y Bus 124 and from LARM 138.

LARR 136 and LARM 138 are utilized to provide logical and physical addresses to SPAD 128 and MAD 130. The general format of CS 101's logical addresses has been previously described. In those descriptions, certain bits were indicated as representing physical or logical page numbers and page offsets, while other bits comprise various control fields. As shown in FIG. 6, LARR 136 has a first 16 bit input connected from Y Bus 124 for receiving 16 bit physical and logical page offset fields from Y Bus 124. LARR 136's second input is connected from LARM 138 and comprises those 16 bits of address used for logical and physical page number fields,, various control fields, and also for short addresses. LARM 138 includes a first 16 bit input connected from Y Bus 124 to receive, for example, a corresponding 16 bits of page number field from Y Bus 124 when LARR 136's first input is receiving a page offset field. LARM 138 further includes 2 inputs to enable varying formats to be selected for bits 0 to 16 of addresses to be provided to SPAD 128. For example, three bits (CRE) of each of these two inputs represents which of CS 101's 8 memory space segments CS 101 is to be addressed by a particular address, while other bits of these two inputs are taken from Y Bus 124.

As indicated in FIG. 6, LARR 136's 32 bit output is connected to LAR Bus 132, which in turn is a source of addresses to SPADM 129, to CS 101's address translation unit control, TG 146 and ATC 148, and to MAD 130.

A first output of LAR Bus 132 is directly to MAD 130, and in particular to an input of MAD Multiplexer (MADM) 140. As will be described further below, MADM 140 is a source of physical address offset fields for MAD 130's output. LAR Bus 132's output directly to MADM 140 is used, for example, to provide physical page offsets to MADM 140 when PU 106 is directly physically addressing MEM 102. This path is also used, in further example, to provide single and double level page table offset fields when performing single and double level page table translations of logical to physical addresses, as previously described.

LAR Bus 132 is further provided with a direct path through Buffer 142 to SPAD Bus 134. As will be described further below, this path may be used to provide physical page number fields directly to Memory Address Latch (MAL) 150 in MAD 130 from LARR 136 in conjunction with the corresponding offset field of a physical address as described above. Finally, will be described further below, SPADM 129 is provided with a bi-directional data input/output connection to SPAD Bus 134. The path comprising LAR Bus 132, Buffer 142, and SPAD Bus 134 may also be used, for example, to write information, such as address maps, into SPADM 129 from LARR 136.

LAR Bus 132 also provides an input into SPAD Multiplexer (SPAM) 144, which has an address output connected to SPADM 129's address input (AD). SPAM 144 is the means by which SPADM 129 is addressed for read and write operations. The path comprising LAR Bus 132 and first input of SPAM 144 is used, in part, to address SPADM 129.

SPAM 144 is provided with three further inputs. Two of these inputs, ACD and ACS, are provided from IR 578 in IPD 114, respectively, and identify destination and source accumulators. ACD and ACS may be used, for example, in addressin9 SPADM 129's address locations assigned, for example, as floating point accumulators. SPAM 144's fourth input is connected from UIR Bus 540 in US 116 is used to microinstruction control in addressing SPADM.

The above combination of address sources for SPAM 144 allows, for example, ACS or ACD inputs to specify a base address in SPADM 129 and VIR microinstruction inputs to specify an offset from such a base address to a floating point source or destination accumulator. This addressing mode also allows the ACS field of IR 578 to be determined without performing a mask and shift operation to read ACS field from IR 578; the information is instead determined from a read from SPADM 129, with the results of such an ACS read indicating the contents of IR 578's ACS field. Microinstruction and IR 578 addressing of SPADM 129 also allows constants to be stored in and recovered from SPADM 129 as required.

Finally, LAR Bus 132 provides an output to SPAD 128's address translation control unit, comprising Tag Compare (TC) 146 and Address Translation Control (ATC) 148. TC 146 receives certain portions of addresses appearing on LAR Bus 132 and SPAD Bus 134 and, utilizing this information, generates control inputs to ATC 148. ATC 148 has a bi-directional connection to Y Bus 124 to receive address translation control information therefrom and to provide such control information onto Y Bus 124.

Referring to SPAD Bus 134, as previously described SPAD Bus 134 has a direct 32 bit connection from LAR Bus 132 through Buffer 142 and has a bi-directional 32 bit input/output to SPADM 129. Certain address fields, that is, physical page number fields, appearing on SPAD Bus 134 from SPADM 129, or from Buffer 142, may be transferred into Memory Address Latch (MAL) 150 in MAD 130.

Finally, SPAD Bus 134 has a 32 bit bi-directional input/output connection to D Bus 112 through SPAD Buffer (SPADB) 152. SPADB 152 allows operations to be performed on SPAD Bus 134, for example writing a page number into MAL 150, while leaving D Bus 112 free for other, concurrent operations. SPADB 152 allows information to be transferred between D Bus 112 and SPADM 129 or TC 146. For example, address information may read from SPADM 129 to D Bus 112, or may be read from D Bus 112 and written into SPADM 129 for example, when loading address maps into SPADM 129. SPADB 152 is particularly used, for example, in floating point operations and for any operation wherein SPADM 129 is being used as PU 106's scratchpad memory, or general registers.

Having described SPAD 128, MAD 130 will be described next below.

3. Memory Addressing (MAD) 130

As previously described, MAD 130 is connected from outputs of SPAD 128 and in turn has an output connected to MAD Bus 108. MAD 130 receives physical addresses from SPAD 128 and transfers those physical addresses to MAD Bus 108 to address MEM 102 for read and write operations. MAD 130 also operates in conjunction with IPD 114 as an instruction prefetch mechanism by providing instruction prefetch physical addresses to MEM 102.

As also previously described, physical addresses for reading from or writing to MEM 102 are comprised of a physical page number field and a physical page offset field. As described above, physical page number fields are provided by SPAD 128 to MAL 150 through SPAD Bus 134, either from SPADM 129 or from LARR 136 through Buffer 142. Physical page offset fields are provided to MADM 140 by LARR 136 through the bus connection directly from LAR Bus 132 to an input of MADM 140.

Outputs of MAL 150 and MADM 140 are connected to Memory Addressing Internal (MADI) Bus 154, which is connected in turn through Memory Address Buffer (MADB) 156 to MAD Bus 108. Physical addresses received by MAD 130 from SPAD 128 may thereby be assembled from MAL 150 and MADM 140 onto MADI Bus 154 and transferred onto MAD Bus 108 to address MEM 102.

That portion of MAD 130 which operates as part of CS 101's prefetch mechanism includes Prefetch Page Number Register (PPNR) 158, Prefetch Page Offset Counter (PPOC) 160, and Write Compare (WCOMP) 162. PPNR 158 has an input connected from and an output connected to MADI Bus 154. PPOC 160 has an input connected from MADI Bus 154 and an output connected from PPNR 158 and MADI Bus 154 and provides outputs to IPD 114.

An initial physical address, including page number and page offset, from which instruction prefetch is to begin is generated by SPAD 128 and is transferred onto MADI Bus 154. Page number and page offset are then transferred from MADI Bus 154 into, respectively, PPNR 158 and PPOC 160. Thereafter, page offset in PPOC 160 is successively incremented and combined, through MADM 140, with page number read from PPNR 158 to provide successive instruction prefetch read addresses on MADI Bus 154 and thus onto MAD Bus 108 to fetch successive double words containing instructions from MEM 102. Sequential instructions are fetched from consecutive *logical* pages, thus barring address jumps. Consecutive logical pages need not be consecutive *physical* pages. PPNR 158 is implemented as a register, rather than a counter, to prevent prefetch from crossing physical page boundaries. When PPOC 160 overflows, prefetch is stopped until PPNR 158 is loaded with a new physical page number, corresponding to the next sequential logical page of execution.

WCOMP 162 checks each physical address to MEM 102 for write operations and compares such addresses to addresses of instructions prefetched by MAD 130 and IPD 114. If a write operation is executed to a physical address within the same page as a prefetched instruction, WCOMP 162 provides an output indicating that the contents of IPD 114 are no longer valid. CS 101 will respond by reinitiating prefetch to obtain new valid instructions from MEM 102.

Description of a preferred embodiment of the present invention is hereby concluded. The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a data processing sytem including:
    processor means for processing said data;
    memory means for storing said data and for storing instructions for directing operations of said system;
    but means for conducting said data and instructions between said memory means and said processor means;
    external terminal means for providing commands for directing said operation of said system;
    external memory means;
    I/O means connected between said terminal means, said external memory means and said bus means for conducting said commands and data between said terminal means, said external memory means and said bus means; and
    microcode control means for providng sequences of microinstructions for controlling said operation of said system, comprising:
    kernel microcode memory means responsive to first certain of said instructions and commands for storing and providing to said system corresponding first certain of said microinstruction sequences for controlling first certain of said operations; and writable microcode memory means responsive to second certain of said instructions and commands for storing and providing to said system corresponding second certain of microinstruction sequences for controlling second certain of said operations, said external memory means being used at least for storing one or more versions of said second certain of said microinstruction sequences, said first certain of said microinstruction sequences including microinstruction sequences for:

(a) controlling said system to read one certain version of said second certain of said microinstruction sequences from said external memory means to memory means; and (b) to read said certain version of said second certain of said microinstruction sequences from said memory means to said writable microcode memory means.

2. The microcode control means of claim 1, wherein said first certain of said instructions comprise an instruction set for an eight bit data processing system and said first certain of said microinstruction sequences allow said system to operate as said eight bit data processing system; and said second certain of said instructions comprise a second set of instructions comprising an extension of said first certain of said instructions, and wherein said second certain of said instructions and said microinstruction sequences allow said system to operate as a sixteen and thirty-two bit instruction set.

3. The microcode control means of claim 1, wherein said first certain of said commands comprise single character commands, and said second certain of said commands comprise multiple character commands.

4. The microcode control means of claim 1, wherein said first certain of said commands include a system reset command.

5. A method of enhancing the operation of a data processing system, the data processing system including:

memory means for storing said data and for storing instructions for directing operations of said system;
external memory means; and microcode control means for providing sequences of microinstructions for controlling said operation of said system, comprising:

kernel microcode memory means responsive to first certain of said instructions and commands for storing and providing to said system corresponding first certain of said microinstruction sequences for controlling first certain of said operations; and writable microcode memory means responsive to second certain of said instructions and commands for storing and providing to said system corresponding second certain of microinstruction sequences for controlling second certain of said operations, and the method comprising the steps of:

initially loading the writable microcode memory means with initial versions of the second certain microinstruction sequences from the external memory means;

in response to the first certain microinstruction sequences, loading the writable microcode memory means with alternate versions of the second certain microinstruction sequences from the external memory means.

6. The method of claim 5, wherein in the data processing system:

said first certain of said instructions comprise an instruction set for an eight bit data processing system and said first certain of said microinstruction sequences allow said system to operate as said eight bit data processing system; and said second certain of said instructions comprise a second set of instructions comprising an extension of said first certain of said instructions, and wherein said second certain of said instructions and said microinstruction sequences allow said system to operate as a sixteen and thirty-two bit instruction set.

7. The method of claim 5, wherein in the data processing system:

said first certain of said commands comprise single character commands, and said second set of commands comprise multiple character commands.

8. The method of claim 5, wherein in the data processing system said first certain of said commands include a system reset command.

* * * * *